United States Patent
Furuta et al.

(10) Patent No.: US 12,445,749 B2
(45) Date of Patent: Oct. 14, 2025

(54) IMAGING CONTROL DEVICE, IMAGING APPARATUS, IMAGING CONTROL METHOD, AND IMAGING CONTROL PROGRAM

(71) Applicant: FUJIFILM Corporation, Tokyo (JP)

(72) Inventors: Yoshinori Furuta, Saitama (JP); Kazuya Oda, Saitama (JP); Tomoyuki Kawai, Saitama (JP)

(73) Assignee: FUJIFILM Corporation, Tokyo (JP)

(*) Notice: Subject to any disclaimer, the term of this patent is extended or adjusted under 35 U.S.C. 154(b) by 323 days.

(21) Appl. No.: 18/328,769

(22) Filed: Jun. 4, 2023

(65) Prior Publication Data

US 2024/0007767 A1 Jan. 4, 2024

(30) Foreign Application Priority Data

Jun. 29, 2022 (JP) ................... 2022-104770

(51) Int. Cl.
*H04N 25/75* (2023.01)
*H04N 25/50* (2023.01)

(52) U.S. Cl.
CPC ............ *H04N 25/75* (2023.01); *H04N 25/50* (2023.01)

(58) Field of Classification Search
CPC ........ H04N 25/75; H04N 25/50; H04N 25/42; H04N 25/532; H04N 25/531; H04N 25/40; H04N 25/51; H04N 25/53; H04N 25/57; H04N 25/58; H04N 25/713; H04N 25/77; H04N 25/771
See application file for complete search history.

(56) References Cited

U.S. PATENT DOCUMENTS

| | | | |
|---|---|---|---|
| 10,623,673 B2 * | 4/2020 | Kawai | H04N 25/78 |
| 10,778,880 B2 | 9/2020 | Kawai | |
| 10,848,692 B2 * | 11/2020 | Irie | H04N 23/63 |
| 11,399,145 B2 | 7/2022 | Kawai | |
| 2015/0319388 A1 * | 11/2015 | Ohshitanai | H04N 25/77 348/301 |
| 2018/0084211 A1 * | 3/2018 | Nishino | H04N 25/618 |
| 2019/0067612 A1 * | 2/2019 | Tashiro | H10F 77/40 |
| 2024/0414450 A1 * | 12/2024 | Yoshita | H04N 25/532 |

FOREIGN PATENT DOCUMENTS

| | | |
|---|---|---|
| WO | 2018088119 | 5/2018 |
| WO | 2020021887 | 1/2020 |

* cited by examiner

*Primary Examiner* — Kelly L Jerabek
(74) *Attorney, Agent, or Firm* — JCIPRNET

(57) ABSTRACT

An imaging control device that controls an imaging element including a plurality of pixel rows in each of which a plurality of pixels each including a photoelectric conversion unit and a charge holding unit which holds charges transferred from the photoelectric conversion unit are arranged in one direction includes a processor, and the processor is configured to: perform a first control as defined herein; perform a second control as defined herein; perform a third control as defined herein; and perform a fourth control as defined herein.

17 Claims, 13 Drawing Sheets

IMAGING CONTROL DEVICE, IMAGING APPARATUS, IMAGING CONTROL METHOD, AND IMAGING CONTROL PROGRAM

CROSS-REFERENCE TO RELATED APPLICATIONS

The present application claims priority under 35 U.S.C. § 119 to Japanese Patent Application No. 2022-104770 filed on Jun. 29, 2022. The above application is hereby expressly incorporated by reference, in its entirety, into the present application.

BACKGROUND OF THE INVENTION

1. Field of the Invention

The present invention relates to an imaging control device, an imaging apparatus, an imaging control method, and a computer readable medium storing an imaging control program.

2. Description of the Related Art

WO2020/021887 A discloses an image processing apparatus including a readout unit that reads out image data which is captured by an imaging element comprising a plurality of photoelectric conversion elements and transmitted to a memory unit and on which light noise is superimposed, as region image data for each of a plurality of regions divided in the memory unit, and that reads out data of a predetermined region again after the readout for each region image data ends, and an output unit that outputs correction image data obtained by correcting captured image data which is captured by the imaging element and stored in the memory unit, for each of the plurality of regions in accordance with the light noise determined in accordance with the data read out again by the readout unit.

WO2018/088119A discloses an imaging apparatus that exposes a light-receiving surface of an imaging element in a case where an imaging instruction is provided, and that reads out an imaging signal from the imaging element in five separate field periods after the end of the exposure, in which the imaging signal is read out from a field including a phase difference detection pixel in the initial field period, the imaging signal is read out from a field including only an imaging pixel in the subsequent field period, a postview image is displayed based on the imaging signal read out in the initial field period, and the postview image is updated based on the imaging signal read out in the subsequent field period.

SUMMARY OF THE INVENTION

The disclosed technology is as follows.

(1) An imaging control device controls an imaging element (imaging element 5) including a plurality of pixel rows (pixel rows 62) in each of which a plurality of pixels (pixels 61) each including a photoelectric conversion unit (photoelectric conversion unit 61A) and a charge holding unit (charge holding unit 61B) which holds charges transferred from the photoelectric conversion unit are arranged in one direction (row direction X), the imaging control device comprising a processor (system controller 11), in which the processor is configured to perform a first control of exposing the plurality of pixel rows (a group G1, a group G2, a group G3, and a group G4) and of transferring charges accumulated in the photoelectric conversion units of the plurality of pixel rows by the exposing to the charge holding units, perform a second control of reading out a signal corresponding to the charges held in the charge holding units of a part (group G1) of the pixel rows among the charge holding units in which the charges are held by the first control, perform a third control of reading out a signal corresponding to the charges held in the charge holding units of the pixel rows (any of the group G2, the group G3, and the group G4) other than the part of the pixel rows among the charge holding units in which the charges are held by the first control, and of exposing the part of the pixel rows from which the signal is read out by the second control, and perform a fourth control of reading out a signal corresponding to the charges held in the charge holding units of the part of the pixel rows from which the signal is read out by the second control.

(2) The imaging control device according to (1), in which the processor is configured to perform a display control of a live view image based on a result of one or both of the second control and the fourth control.

(3) The imaging control device according to (1) or (2), in which the processor is configured to, in the third control, expose the part of the pixel rows by shifting exposure periods of all or a part of the part of the pixel rows.

(4) The imaging control device according to any one of (1) to (3), in which the imaging element includes a phase difference detection pixel row (second pixel row) that is the pixel row including a phase difference detection pixel, the part of the pixel rows includes the phase difference detection pixel row, and the processor is configured to derive an evaluation value for focal point adjustment based on a signal that is read out from the charge holding units of the phase difference detection pixel row by the second control.

(5) The imaging control device according to (4), in which the processor is configured to determine whether to execute or not execute the third control based on the evaluation value.

(6) The imaging control device according to (5), in which the processor is configured to not execute the third control in a case where the evaluation value is greater than or equal to a threshold value.

(7) The imaging control device according to (5) or (6), in which the processor is configured to, in a case of not executing the third control, perform, instead of the third control and of the fourth control, a fifth control of reading out a signal corresponding to the charges held in the charge holding units of the pixel rows other than the part of the pixel rows among the charge holding units in which the charges are held by the first control.

(8) The imaging control device according to (5) or (6), in which the processor is configured to, in a case of not executing the third control, perform the first control instead of the third control and of the fourth control.

(9) The imaging control device according to (4), in which the processor is configured to control a readout speed of the signal in the fourth control based on the evaluation value.

(10) The imaging control device according to (9), in which the processor is configured to, in a case where the evaluation value is greater than or equal to a threshold value, set the readout speed of the signal in the fourth control to be higher than a readout speed of the signal in the third control.

(11) The imaging control device according to any one of (1) to (8), in which the processor is configured to set a readout speed of the signal in the fourth control to be higher than a readout speed of the signal in the third control.

(12) The imaging control device according to any one of (1) to (11), in which the processor is configured to, after the second control is performed, perform, at least once, processing of performing the third control and the fourth control in this order.

(13) The imaging control device according to (12), in which the processor is configured to, in a case where the readout of the signal from the charge holding units of the pixel rows other than the part of the pixel rows is completed by the third control, start the first control by omitting the fourth control that is to be performed subsequently to the third control, or together with the fourth control.

(14) The imaging control device according to (12), in which the processor is configured to perform the processing n times with n being a plural number and, after the processing performed for the n-th time, perform the first control and a control (control of executing driving illustrated by straight line ROg4) of reading out a signal corresponding to the charges held in the charge holding units in a pixel row in which signal readout is not completed among the pixel rows other than the part of the pixel rows.

(15) An imaging apparatus (digital camera 100) comprising the imaging control device according to any one of (1) to (14), and the imaging element.

(16) An imaging control method for controlling an imaging element including a plurality of pixel rows in each of which a plurality of pixels each including a photoelectric conversion unit and a charge holding unit which holds charges transferred from the photoelectric conversion unit are arranged in one direction, the imaging control method comprising performing a first control of exposing the plurality of pixel rows and of transferring charges accumulated in the photoelectric conversion units of the plurality of pixel rows by the exposing to the charge holding units, performing a second control of reading out a signal corresponding to the charges held in the charge holding units of a part of the pixel rows among the charge holding units in which the charges are held by the first control, performing a third control of reading out a signal corresponding to the charges held in the charge holding units of the pixel rows other than the part of the pixel rows among the charge holding units in which the charges are held by the first control, and of exposing the part of the pixel rows from which the signal is read out by the second control, and performing a fourth control of reading out a signal corresponding to the charges held in the charge holding units of the part of the pixel rows from which the signal is read out by the second control.

(17) An imaging control program, which is stored in a computer readable medium, for controlling an imaging element including a plurality of pixel rows in each of which a plurality of pixels each including a photoelectric conversion unit and a charge holding unit which holds charges transferred from the photoelectric conversion unit are arranged in one direction, the imaging control program causing a processor to execute performing a first control of exposing the plurality of pixel rows and of transferring charges accumulated in the photoelectric conversion units of the plurality of pixel rows by the exposing to the charge holding units, performing a second control of reading out a signal corresponding to the charges held in the charge holding units of a part of the pixel rows among the charge holding units in which the charges are held by the first control, performing a third control of reading out a signal corresponding to the charges held in the charge holding units of the pixel rows other than the part of the pixel rows among the charge holding units in which the charges are held by the first control, and of exposing the part of the pixel rows from which the signal is read out by the second control, and performing a fourth control of reading out a signal corresponding to the charges held in the charge holding units of the part of the pixel rows from which the signal is read out by the second control.

DESCRIPTION OF THE PREFERRED EMBODIMENTS

Figure 1:
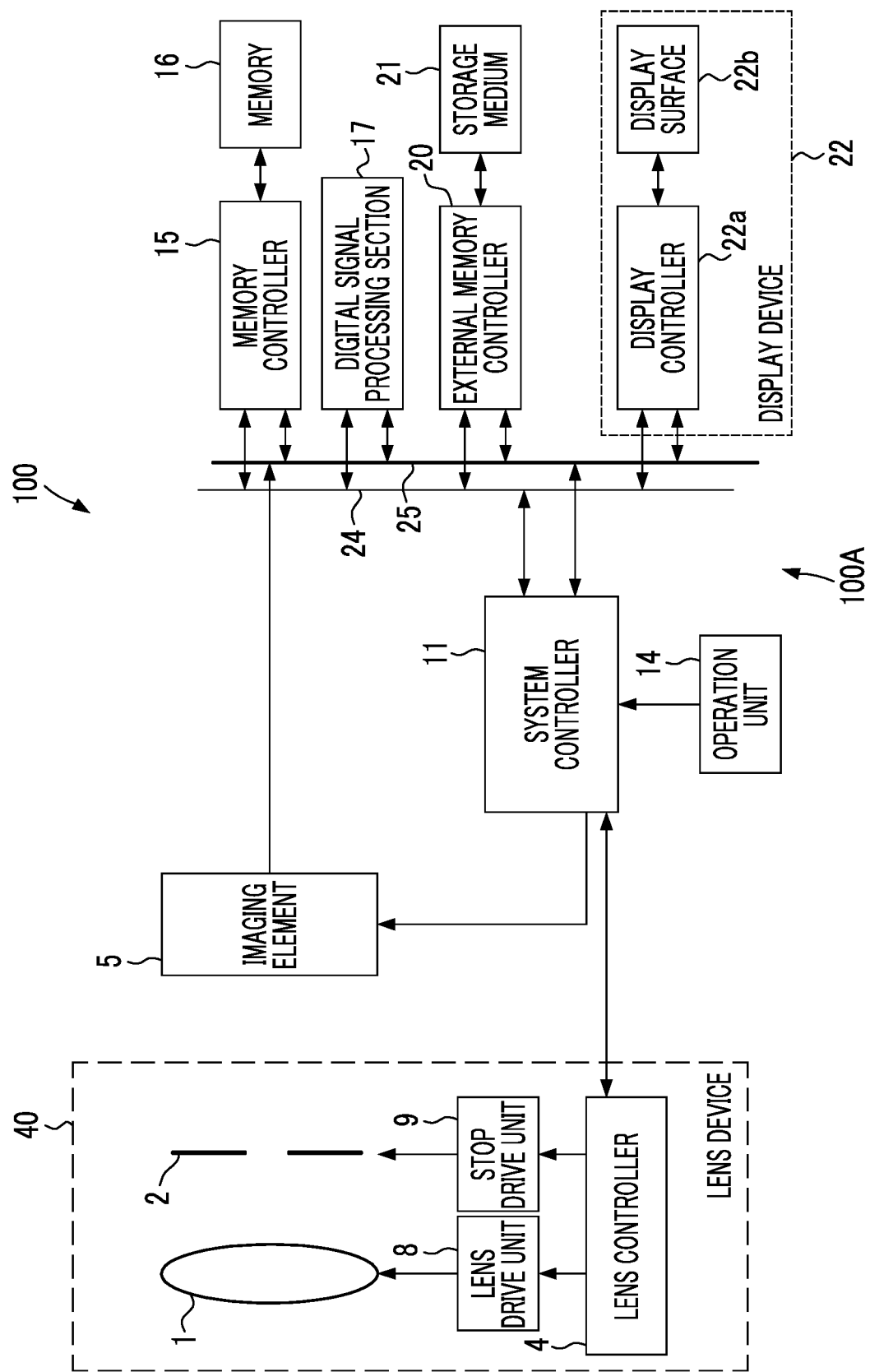
FIG. 1 is a diagram illustrating a schematic configuration of a digital camera 100 that is one embodiment of an imaging apparatus according to the present invention.

FIG. 1 is a diagram illustrating a schematic configuration of a digital camera 100 that is one embodiment of an imaging apparatus according to the present invention. The digital camera 100 illustrated in FIG. 1 comprises a lens device 40 including an imaging lens 1, a stop 2, a lens drive unit 8 that drives the imaging lens 1, a stop drive unit 9 that drives the stop 2, and a lens controller 4 that controls the lens drive unit 8 and the stop drive unit 9; and a body part 100A.

The body part 100A comprises an imaging element 5, a system controller 11 that controls the entire electric control system of the digital camera 100, an operation unit 14, a display device 22, a memory 16 including a random access memory (RAM), a read only memory (ROM), and the like, a memory controller 15 that controls data storage in the memory 16 and data readout from the memory 16, a digital signal processing section 17, and an external memory controller that controls data storage in a storage medium 21 and data readout from the storage medium 21.

The lens device 40 may be attachable to and detachable from the body part 100A or may be integrated with the body part 100A. The imaging lens 1 includes a focus lens or the like that can be moved in an optical axis direction. The focus lens is a lens for adjusting a focal point of an imaging optical system including the imaging lens 1 and the stop 2, and is composed of a single lens or of a plurality of lenses. By moving the focus lens in the optical axis direction, a position of a principal point of the focus lens changes along the optical axis direction, and a focal position on a subject side is changed. A liquid lens of which a position of a principal point in the optical axis direction can be changed by electrical control may be used as the focus lens.

The lens controller 4 of the lens device 40 changes the position of the principal point of the focus lens included in the imaging lens 1 by controlling the lens drive unit 8 based on a lens drive signal transmitted from the system controller 11. The lens controller 4 of the lens device changes an amount of opening (F number) of the stop 2 by controlling the stop drive unit 9 based on a driving control signal transmitted from the system controller 11.

The imaging element 5 images a subject through the imaging optical system including the imaging lens 1 and the stop 2.

The imaging element 5 includes a light-receiving surface 60 (refer to FIG. 2) on which a plurality of pixels are two-dimensionally disposed, converts a subject image formed on the light-receiving surface 60 by the imaging optical system into a pixel signal group via the plurality of pixels, and outputs the pixel signal group. For example, a complementary metal-oxide semiconductor (CMOS) image sensor is used as the imaging element 5. The imaging element 5 is driven by a driver, not illustrated, and the driver is controlled by the system controller 11.

The system controller 11 controls the entire digital camera 100 and has a hardware structure corresponding to various processors that perform processing by executing programs including an imaging control program. The programs executed by the system controller 11 are stored in the ROM of the memory 16.

Examples of the various processors include a central processing unit (CPU) that is a general-purpose processor performing various types of processing by executing a program, a programmable logic device (PLD) such as a field programmable gate array (FPGA) that is a processor of which a circuit configuration can be changed after manufacture, or a dedicated electric circuit such as an application specific integrated circuit (ASIC) that is a processor having a circuit configuration dedicatedly designed to execute specific processing. More specifically, the various processors have a structure of an electric circuit in which circuit elements such as semiconductor elements are combined.

The system controller 11 may be configured with one of the various processors or may be configured with a combination of two or more processors of the same type or of different types (for example, a combination of a plurality of FPGAs or a combination of a CPU and a FPGA).

The system controller 11 drives the imaging element 5 and the lens device 40 and outputs the subject image captured through the imaging optical system of the lens device 40 as a pixel signal group in accordance with the imaging control program. The system controller 11 and the memory 16 constitute an imaging control device. By processing the pixel signal group output from the imaging element 5 via the digital signal processing section 17, captured image data that is data suitable for display on the display device 22 or is data suitable for storage in the storage medium 21 is generated.

A command signal from a user is input into the system controller 11 through the operation unit 14. The operation unit 14 includes a touch panel integrated with a display surface 22b, and various buttons and the like.

The display device 22 comprises the display surface 22b configured with an organic electroluminescence (EL) panel, a liquid crystal panel, or the like, and a display controller 22a that controls display on the display surface 22b.

The memory controller 15, the digital signal processing section 17, the external memory controller 20, and the display controller 22a are connected to each other through a control bus 24 and through a data bus 25 and are controlled in accordance with instructions from the system controller 11.

Figure 2:
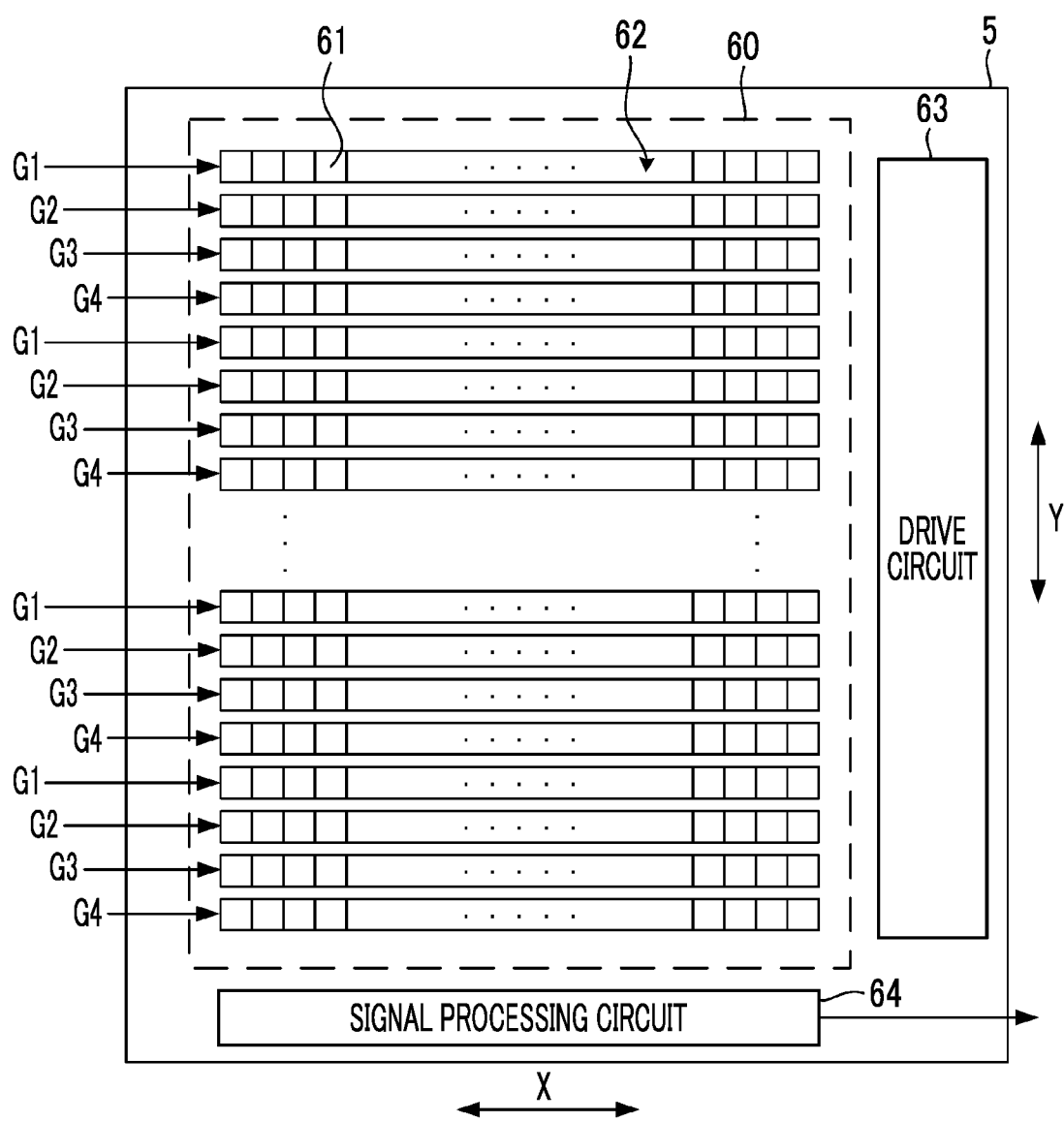
FIG. 2 is a schematic plan view illustrating a schematic configuration of an imaging element 5 illustrated in FIG. 1.
Figure 3:
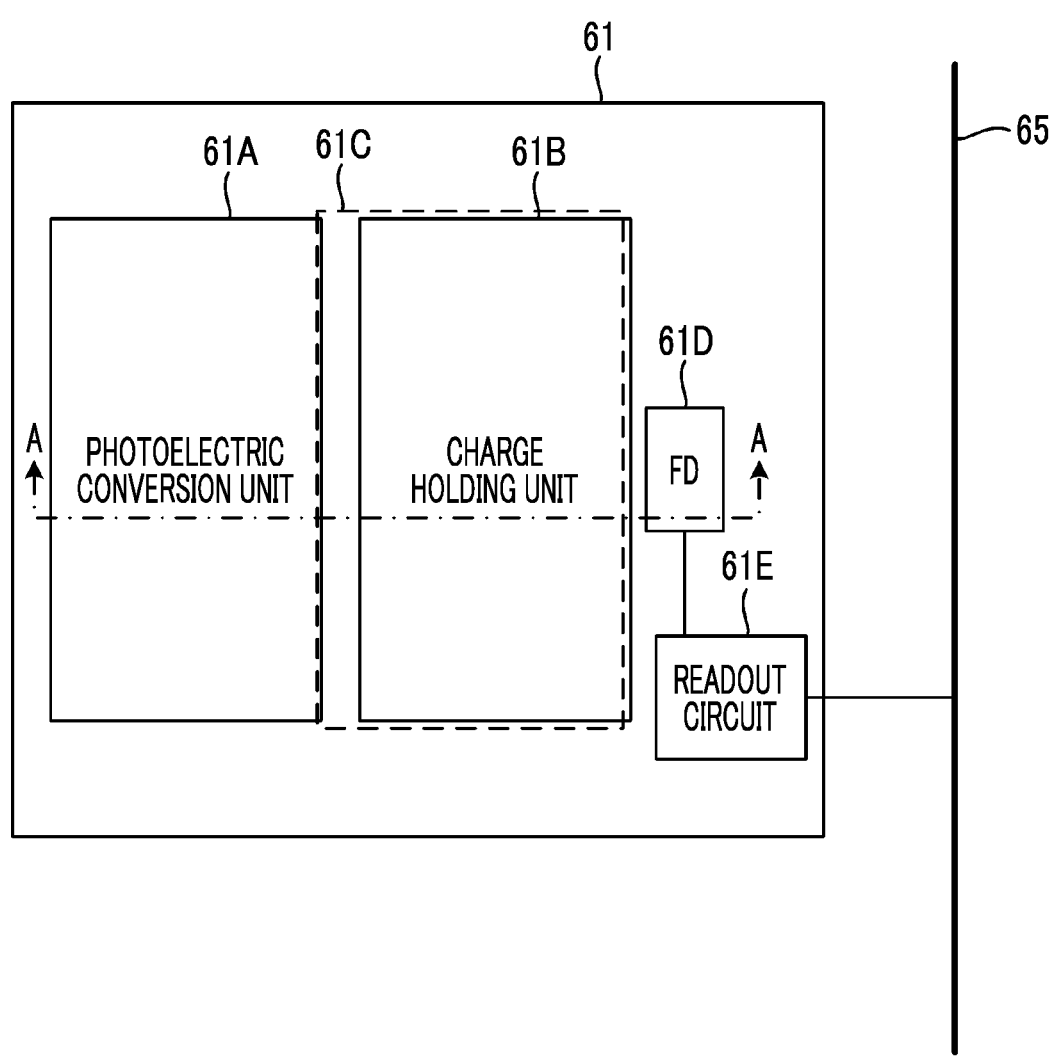
FIG. 3 is a schematic plan view illustrating a schematic configuration of a pixel 61 in the imaging element 5 illustrated in FIG. 2.
Figure 4:
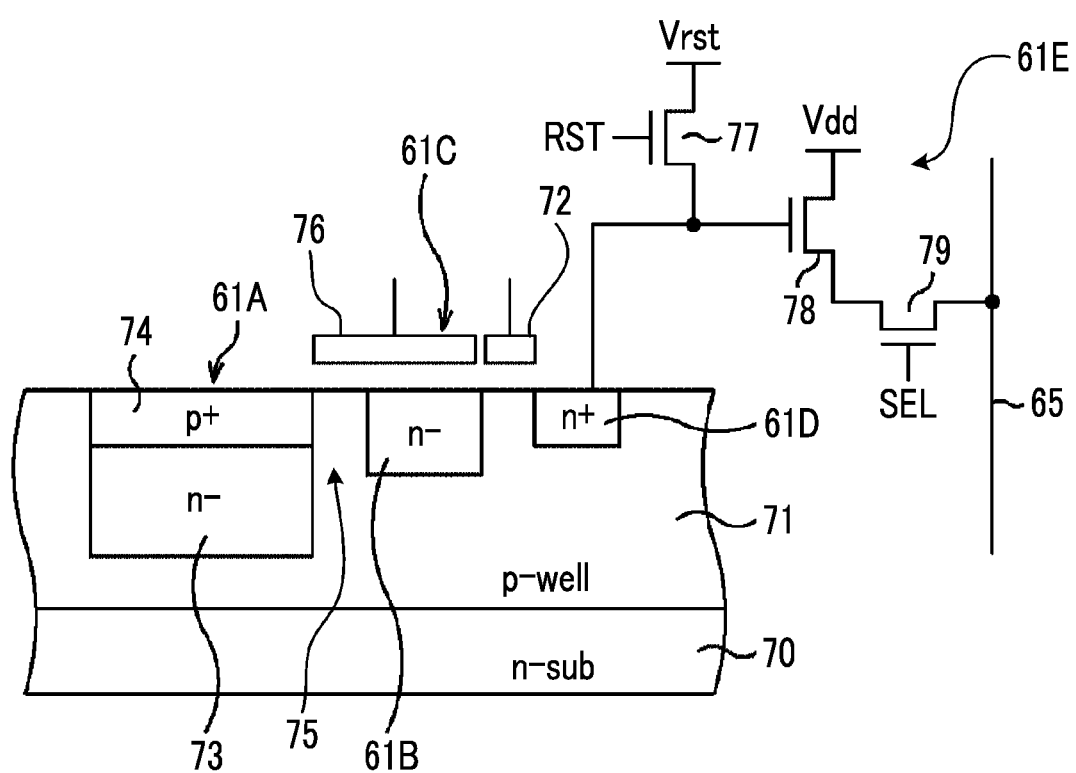
FIG. 4 is a schematic cross section view of the pixel 61 illustrated in FIG. 3 taken along line A-A.

FIG. 2 is a schematic plan view illustrating a schematic configuration of the imaging element 5 illustrated in FIG. 1. FIG. 3 is a schematic plan view illustrating a schematic configuration of a pixel 61 in the imaging element 5 illustrated in FIG. 2. FIG. 4 is a schematic cross section view of the pixel 61 illustrated in FIG. 3 taken along line A-A.

The imaging element 5 comprises the light-receiving surface 60 on which a plurality of pixel rows 62 each consisting of a plurality of the pixels 61 arranged in a row direction X are arranged in a column direction Y orthogonal to the row direction X, a drive circuit 63 that drives the pixels 61 arranged on the light-receiving surface 60, and a signal processing circuit 64 that processes a pixel signal read out into a signal line from each pixel 61 of the pixel rows 62 arranged on the light-receiving surface 60.

The plurality of pixels 61 include a phase difference detection pixel that receives one of a pair of luminous fluxes which have passed through two different parts arranged in the row direction X in a pupil region of the imaging optical system, and that detects a signal corresponding to an amount of received light, a phase difference detection pixel that receives the other of the pair of luminous fluxes and that detects a signal corresponding to an amount of received light, and a normal pixel that receives both of the pair of luminous fluxes and that detects a signal corresponding to an amount of received light.

The pixel rows 62 include a first pixel row including only the normal pixel, and a second pixel row including the phase difference detection pixel and the normal pixel. For example, the second pixel rows are discretely disposed at equal intervals in the column direction Y. In the imaging element 5, the phase difference detection pixel is not essential, and all of the pixels 61 may be configured with the normal pixels.

Hereinafter, in FIG. 2, an end part on an upper side of the light-receiving surface 60 in the column direction Y will be referred to as an upper end, and an end part on a lower side of the light-receiving surface 60 in the column direction Y will be referred to as a lower end. The upper end constitutes one end of the light-receiving surface 60, and the lower end constitutes the other end of the light-receiving surface 60.

The pixels 61 disposed on the light-receiving surface 60 are classified into a plurality of groups. For example, it is assumed that M is an integer greater than or equal to 0, the number of groups set on the light-receiving surface 60 is n (here, n=4), and k is 1 to n. In the example in FIG. 2, the pixel row 62 that is the (n×M+k)-th pixel row from the upper end side of the light-receiving surface 60 among all pixel rows 62 arranged on the light-receiving surface 60 is a group Gk. The pixels 61 disposed on the light-receiving surface 60 are classified into a group G1, a group G2, a group G3, and a group G4 as illustrated in FIG. 2. This grouping is an example, and the present invention is not limited thereto.

As illustrated in FIG. 3, each pixel 61 comprises a photoelectric conversion unit 61A, a charge holding unit 61B, a charge transfer unit 61C, a floating diffusion 61D, and a readout circuit 61E.

The photoelectric conversion unit 61A receives light that has passed through the imaging optical system of the lens device 40, and generates and accumulates charges corresponding to an amount of received light. The photoelectric conversion unit 61A is configured with a photodiode or the like.

The charge transfer unit 61C transfers the charges accumulated in the photoelectric conversion unit 61A to the charge holding unit 61B. The charge transfer unit 61C is configured with an impurity region in a semiconductor substrate and with an electrode formed above the impurity region.

Charges are transferred from the photoelectric conversion unit 61A to the charge holding unit 61B by causing the drive circuit 63 to control a voltage applied to the electrode constituting the charge transfer unit 61C.

The charge holding unit 61B holds the charges transferred from the photoelectric conversion unit 61A by the charge transfer unit 61C. The charge holding unit 61B is configured with the impurity region in the semiconductor substrate.

The floating diffusion 61D is used for converting charges into signals, to which the charges held in the charge holding unit 61B are transferred.

The readout circuit 61E is a circuit that reads out a signal corresponding to a potential of the floating diffusion 61D into a signal line 65 as a pixel signal. The readout circuit 61E is driven by the drive circuit 63. A set of the pixel signals constitutes the image signal.

As illustrated in FIG. 4, a P-well layer 71 is formed on a surface of an N-type substrate 70, and the photoelectric conversion unit 61A is formed in a surface part of the P-well layer 71.

The photoelectric conversion unit 61A is configured with an N-type impurity layer 73 and with a P-type impurity layer 74 formed on the N-type impurity layer 73. The N-type substrate 70 and the P-well layer 71 constitute the semiconductor substrate.

The charge holding unit 61B consisting of an N-type impurity layer is formed in the surface part of the P-well layer 71 to be slightly spaced from the photoelectric conversion unit 61A.

A transfer electrode 76 is formed above a region 75 of the P-well layer 71 between the charge holding unit 61B and the photoelectric conversion unit 61A through an oxide film, not illustrated.

The region 75 and the transfer electrode 76 constitute the charge transfer unit 61C. While the transfer electrode 76 is also formed above the charge holding unit 61B in the example in FIG. 3, the transfer electrode 76 may be formed above at least the region 75.

The charges accumulated in the photoelectric conversion unit 61A can be transferred to the charge holding unit 61B by controlling a potential of the transfer electrode 76 to form a channel in the region 75. The potential of the transfer electrode 76 is controlled by the drive circuit 63.

The floating diffusion 61D consisting of an N-type impurity layer is formed in the surface part of the P-well layer 71 to be slightly spaced from the charge holding unit 61B.

A reading electrode 72 is formed above the P-well layer 71 between the charge holding unit 61B and the floating diffusion 61D through an oxide film, not illustrated.

The charges held in the charge holding unit 61B can be transferred to the floating diffusion 61D by controlling a potential of the reading electrode 72 to form a channel in a region between the charge holding unit 61B and the floating diffusion 61D. The potential of the reading electrode 72 is controlled by the drive circuit 63.

In the example illustrated in FIG. 4, the readout circuit 61E is configured with a reset transistor 77 for resetting the potential of the floating diffusion 61D, an output transistor 78 that converts the potential of the floating diffusion 61D into a pixel signal and that outputs the pixel signal, and a selection transistor 79 for selectively reading out the pixel signal output from the output transistor 78 into the signal line 65. The configuration of the readout circuit is merely an example, and the present invention is not limited thereto. The readout circuit 61E may be shared by the plurality of pixels 61.

In each pixel 61, a light shielding film, not illustrated, is provided, and a region other than the photoelectric conversion unit 61A is shielded from light by the light shielding film.

The structure of each pixel 61 illustrated in FIG. 3 and in FIG. 4 is merely an example, and the present invention is not limited thereto.

The drive circuit 63 illustrated in FIG. 2 performs, by independently driving the transfer electrode 76, the reading electrode 72, and the readout circuit 61E of each pixel 61 for each pixel row 62, reset of each photoelectric conversion unit 61A included in the pixel row 62 (discharge of the charges accumulated in the photoelectric conversion unit 61A), readout of a pixel signal corresponding to the charges accumulated in each photoelectric conversion unit 61A into the signal line 65, and the like.

In addition, the drive circuit 63 transfers the charges from the photoelectric conversion unit 61A to the charge holding unit 61B of each pixel 61 at the same time by driving the charge transfer units 61C of all of the pixels 61 at the same time. The drive circuit 63 is controlled by the system controller 11.

The reset of the photoelectric conversion unit 61A is performed by setting the charge transfer unit 61C to a state of being able to transfer charges and by resetting the floating diffusion 61D via the reset transistor 77 in a state where a channel is formed in the semiconductor substrate below the reading electrode 72.

Thus, in a state where the readout of the pixel signal corresponding to the charges held in the charge holding unit 61B is completed, the reset of the photoelectric conversion unit 61A (in other words, a start of exposure of the photoelectric conversion unit 61A) that transfers charges to the charge holding unit 61B can be performed.

The signal processing circuit 64 illustrated in FIG. 2 performs correlative double sampling processing on the pixel signal read out into the signal line 65 from each pixel 61 of the pixel row 62, converts the pixel signals after the correlative double sampling processing into a digital signal, and outputs the digital signal to the data bus 25 (refer to FIG. 1). The signal processing circuit 64 is controlled by the system controller 11. The digital signal processing section 17 generates the captured image data by performing signal processing such as demosaicing and gamma-correction processing on a pixel signal group output to the data bus 25 from the imaging element 5.

The system controller 11 can drive the imaging element 5 in each of global reset driving, global shutter driving, rolling reset driving, rolling shutter driving, and rolling readout driving.

The global reset driving is driving of starting exposure of each pixel 61 at the same time by resetting the photoelectric conversion unit 61A of each pixel 61 to be exposed at the same time.

The global shutter driving is driving of ending the exposure in each pixel 61 at the same time by transferring the charges accumulated in the photoelectric conversion unit 61A of each pixel 61 because of the exposure started in each pixel 61 by the global reset driving to the charge holding unit 61B at the same time.

The rolling reset driving is driving of sequentially performing, while changing the pixel row 62, processing of resetting each photoelectric conversion unit 61A of the pixel row 62 to start the exposure of each photoelectric conversion unit 61A with respect to the plurality of pixel rows 62 to be exposed.

The rolling shutter driving is driving of sequentially performing, while changing the pixel row 62, processing of transferring charges from the photoelectric conversion units 61A of the pixel row 62 of which exposure is started by the rolling reset driving, to the charge holding units 61B of the pixel row 62 to end the exposure of the pixel row 62.

Performing the rolling reset driving and the rolling shutter driving results in a state where exposure periods of all of the plurality of pixel rows 62 to be exposed are slightly shifted from each other. However, a state where exposure periods of a part of the plurality of pixel rows to be exposed are shifted from each other is also possible by performing the rolling reset driving and the rolling shutter driving.

For example, a configuration in which the signal processing circuit 64 is further disposed above the light-receiving surface 60 is assumed. In this configuration, since two signal processing circuits 64 are present, pixel signals can be read out from two pixel rows 62 at the same time. Thus, in a case where every two adjacent pixel rows 62 among the plurality of pixel rows 62 to be exposed are set as a pair, it is possible to cause each pair to have the same exposure period and to shift the exposure period for each pair by sequentially performing processing of starting the exposure of the pair while changing the pair and by sequentially performing processing of ending the exposure of the pair while changing the pair.

The rolling readout driving is driving of sequentially reading out, for each pixel row 62, the pixel signal corresponding to the charges held in each charge holding unit 61B.

In a case where the digital camera 100 is set to an imaging mode, the system controller 11 continuously performs imaging for live view image display (hereinafter, referred to as LV imaging) based on a set of, for example, the rolling reset driving, the rolling shutter driving, and the rolling readout driving. The system controller 11 may perform the LV imaging based on a set of the global reset driving, the global shutter driving, and the rolling readout driving.

In a case where an instruction (hereinafter, referred to as an imaging instruction) to perform imaging for storage (hereinafter, referred to as main imaging) for storing still image data in the storage medium 21 is received during execution of the set, the system controller 11 performs the main imaging by performing a control of executing the global reset driving and the global shutter driving. The digital signal processing section 17 illustrated in FIG. 1 generates the captured image data by processing the pixel signal group output from the imaging element 5 by the main imaging and stores the captured image data in the storage medium 21.

Figure 5:
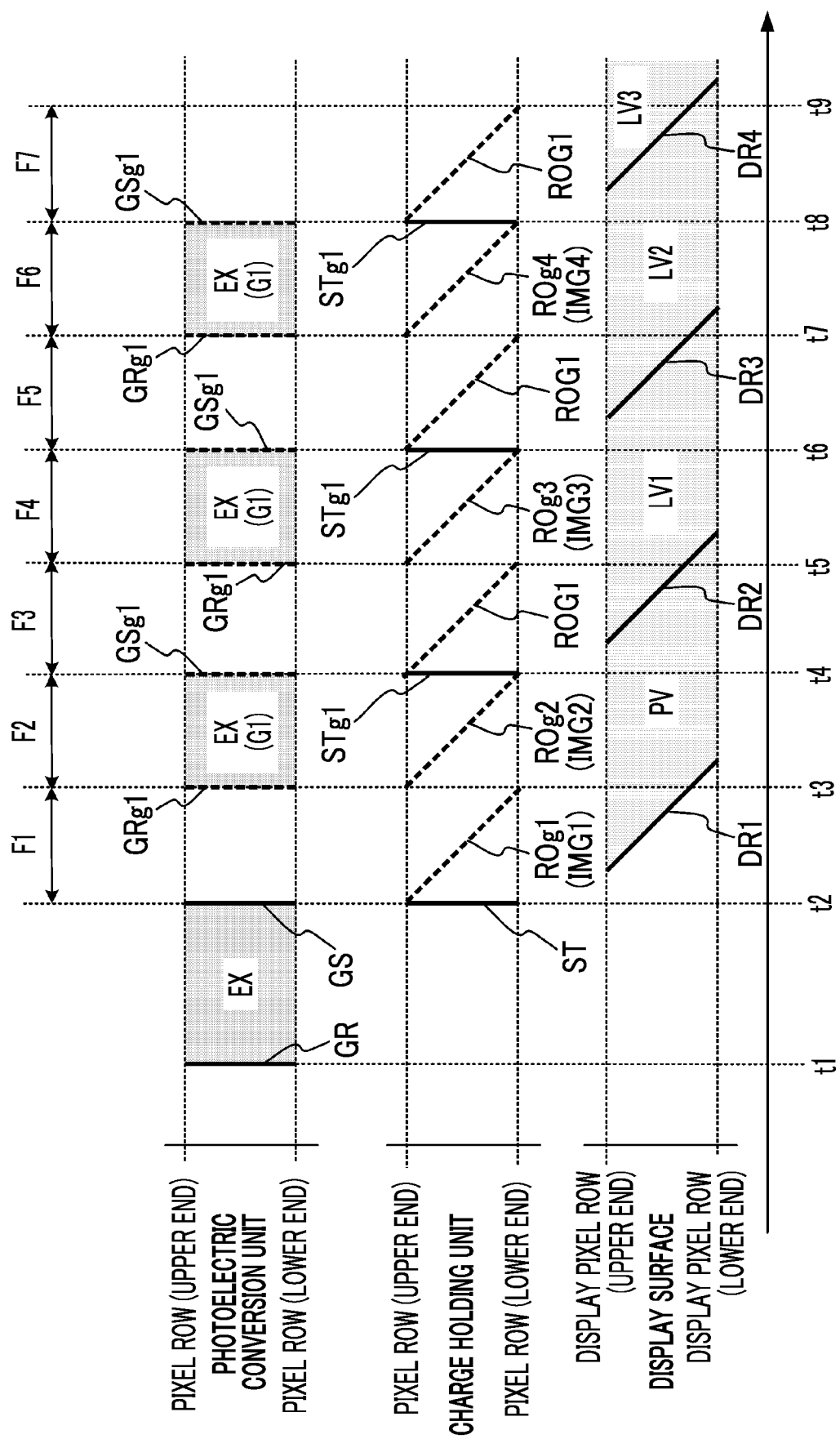
FIG. 5 is a timing chart illustrating operation of the digital camera 100 illustrated in FIG. 1 in an imaging mode.

FIG. 5 is a timing chart illustrating operation of the digital camera 100 illustrated in FIG. 1 in the imaging mode. In FIG. 5, a horizontal axis denotes a time point.

Driving timings of the photoelectric conversion units 61A and the charge holding units 61B of each pixel row 62 of the imaging element 5 are illustrated in the upper part and the middle part of FIG. 5. In the upper part and the middle part of FIG. 5, a vertical axis denotes a position of the pixel row 62 in the column direction Y.

Straight lines illustrated by solid lines and by broken lines in the upper part of FIG. 5 illustrate timings at which the global reset driving and the global shutter driving are performed.

Straight lines illustrated by solid lines in the middle part of FIG. 5 illustrate a timing at which charges are held in the charge holding units 61B by the global shutter driving.

Straight lines illustrated by broken lines in the middle part of FIG. 5 illustrate a timing at pixel signals are read out from the charge holding units 61B by the rolling readout driving.

A drawing state of the display surface 22*b* is illustrated in the lower part of FIG. 5. In the lower part of FIG. 5, a vertical axis denotes a position of a display pixel row of the display surface 22*b* in the column direction Y. Straight lines of solid lines illustrated in the lower part of FIG. 5 illustrate a timing at which drawing is performed in the display pixel row of the display surface 22*b*.

In a case where the imaging mode is set, the system controller 11 performs a control of continuously performing the LV imaging and of displaying a live view image on the display surface 22*b*. In a case where the imaging instruction is provided while the LV imaging is performed, the system controller 11 ends the LV imaging that is being executed when the imaging instruction is received.

At time point t1, the system controller 11 performs a control of executing the global reset driving illustrated by straight line GR and resets the photoelectric conversion units 61A at the same time in all of the pixel rows 62 formed on the light-receiving surface 60. Accordingly, exposure is started at the same timing in all of the pixel rows 62 formed on the light-receiving surface 60.

Then, in a case where a predetermined exposure time elapses, the system controller 11 performs a control of executing the global shutter driving illustrated by straight line GS at time point t2. By this global shutter driving, charges are transferred from the photoelectric conversion units 61A to the charge holding units 61B at the same time in all of the pixel rows 62 formed on the light-receiving surface 60, and the charges are held in the charge holding units 61B as illustrated by straight line ST. Accordingly, exposure ends at the same timing in all of the pixel rows 62 formed on the light-receiving surface 60. In FIG. 5, a period surrounded by straight line GR and by straight line GS is illustrated as an exposure period EX of the main imaging.

After performing the control of executing the global shutter driving illustrated by straight line GS, the system controller 11 performs a control of executing the rolling readout driving illustrated by straight line ROg1. By this rolling readout driving, the pixel rows 62 in any one (here, the group G1 is assumed) of the group G1, the group G2, the group G3, and the group G4 are sequentially selected from the upper end toward the lower end of the light-receiving surface 60, and pixel signals are read out from the charge holding units 61B of the selected pixel row 62. A pixel signal group read out from the group G1 by the rolling readout driving illustrated by straight line ROg1 will be referred to as a pixel signal group IMG1.

The system controller 11 causes the digital signal processing section 17 to process the pixel signals that are sequentially read out from the pixel rows 62 of the group G1 by the rolling readout driving illustrated by straight line ROg1. In a case where a line image is generated by this processing, the system controller 11 performs a control of displaying the line image on the display surface 22b. By this control, a live view image (a so-called postview image PV) of the subject imaged by the main imaging (exposure period EX) is displayed on the display surface 22b as illustrated by straight line DR1.

In a case where time point t3 at which the rolling readout driving illustrated by straight line ROg1 ends is reached, the system controller 11 performs a control of executing the global reset driving illustrated by straight line GRg1 with respect to the group G1. By this global reset driving, the photoelectric conversion units 61A are reset at the same time in all of the pixel rows 62 of the group G1, and exposure is started at the same timing in all of the pixel rows 62 of the group G1. At time point t3, readout of pixel signals from all of the charge holding units 61B in the group G1 is completed by the rolling readout driving illustrated by straight line ROg1. Thus, exposure can be started at the same time in all of the pixels 61 of the group G1 at time point t3.

In addition, at time point t3, the system controller 11 performs a control of executing the rolling readout driving illustrated by straight line ROg2. By this rolling readout driving, the pixel rows 62 in any one (here, the group G2 is assumed) of the group G2, the group G3, and the group G4 are sequentially selected from the upper end toward the lower end of the light-receiving surface 60, and pixel signals are read out from the charge holding units 61B of the selected pixel row 62. A pixel signal group read out from the group G2 by the rolling readout driving illustrated by straight line ROg2 will be referred to as a pixel signal group IMG2.

In a case where time point t4 at which the rolling readout driving illustrated by straight line ROg2 ends is reached, the system controller 11 performs a control of executing the global shutter driving illustrated by straight line GSg1 with respect to the group G1. By this global shutter driving, charges are transferred from the photoelectric conversion units 61A to the charge holding units 61B at the same time in all of the pixel rows 62 of the group G1, and the charges are held in the charge holding units 61B as illustrated by straight line STg1. Accordingly, exposure ends at the same timing in all of the pixel rows 62 of the group G1. In FIG. 5, a period surrounded by straight line GRg1 and by straight line GSg1 is illustrated as the exposure period EX (G1).

In addition, after performing the control of executing the global shutter driving illustrated by straight line GSg1 at time point t4, the system controller 11 performs a control of executing the rolling readout driving illustrated by straight line ROG1. In this rolling readout driving, the pixel rows 62 of the group G1 are sequentially selected from the upper end toward the lower end of the light-receiving surface 60, and pixel signals are read out from the charge holding units 61B of the selected pixel row 62.

The system controller 11 causes the digital signal processing section 17 to process the pixel signals that are sequentially read out from the pixel rows 62 of the group G1 by the rolling readout driving which is started at time point t4 and which is illustrated by straight line ROG1. In a case where a line image is generated by this processing, the system controller 11 performs a control of displaying the line image on the display surface 22b. By this control, a live view image LV1 of the subject captured by the group G1 in a period F2 between time point t3 and time point t4 is displayed on the display surface 22b as illustrated by straight line DR2. In FIG. 5, a period between time point t2 and time point t3 is illustrated as a period F1.

In a case where time point t5 at which the rolling readout driving which is started at time point t4 and which is illustrated by straight line ROG1 ends is reached, the system controller 11 performs a control of executing the global reset driving illustrated by straight line GRg1 with respect to the group G1. By this global reset driving, the photoelectric conversion units 61A are reset at the same time in all of the pixel rows 62 of the group G1, and exposure is started at the same timing in all of the pixel rows 62 of the group G1.

In addition, at time point t5, the system controller 11 performs a control of executing the rolling readout driving illustrated by straight line ROg3. In this rolling readout driving, the pixel rows 62 in any one (here, the group G3 is assumed) of the group G3 and the group G4 are sequentially selected from the upper end toward the lower end of the light-receiving surface 60, and pixel signals are read out from the charge holding units 61B of the selected pixel row 62. A pixel signal group read out from the group G3 by the rolling readout driving illustrated by straight line ROg3 will be referred to as a pixel signal group IMG3.

In a case where time point t6 at which the rolling readout driving illustrated by straight line ROg3 ends is reached, the system controller 11 performs a control of executing the global shutter driving illustrated by straight line GSg1 with respect to the group G1. By this global shutter driving, charges are transferred from the photoelectric conversion units 61A to the charge holding units 61B at the same time in all of the pixel rows 62 of the group G1, and the charges are held in the charge holding units 61B as illustrated by straight line STg1. Accordingly, exposure ends at the same timing in all of the pixel rows 62 of the group G1.

In addition, after performing the control of executing the global shutter driving illustrated by straight line GSg1 at time point t6, the system controller 11 performs a control of executing the rolling readout driving illustrated by straight line ROG1. In this rolling readout driving, the pixel rows 62 of the group G1 are sequentially selected from the upper end toward the lower end of the light-receiving surface 60, and pixel signals are read out from the charge holding units 61B of the selected pixel row 62.

The system controller 11 causes the digital signal processing section 17 to process the pixel signals that are sequentially read out from the pixel rows 62 of the group G1 by the rolling readout driving which is started at time point t6 and which is illustrated by straight line ROG1. In a case where a line image is generated by this processing, the system controller 11 performs a control of displaying the line image on the display surface 22b. By this control, a live view image LV2 of the subject captured in a period F4 between time point t5 and time point t6 is displayed on the display surface 22b as illustrated by straight line DR3. In FIG. 5, a period between time point t4 and time point t5 is illustrated as a period F3.

In a case where time point t7 at which the rolling readout driving which is started at time point t6 and which is illustrated by straight line ROG1 ends is reached, the system controller 11 performs a control of executing the global reset driving illustrated by straight line GRg1 with respect to the group G1. By this global reset driving, the photoelectric conversion units 61A are reset at the same time in all of the pixel rows 62 of the group G1, and exposure is started at the same timing in all of the pixel rows 62 of the group G1.

In addition, at time point t7, the system controller 11 performs a control of executing the rolling readout driving illustrated by straight line ROg4. In this rolling readout driving, the pixel rows 62 of the group G4 are sequentially selected from the upper end toward the lower end of the light-receiving surface 60, and pixel signals are read out from the charge holding units 61B of the selected pixel row 62. A pixel signal group read out from the group G4 by the rolling readout driving illustrated by straight line ROg4 will be referred to as a pixel signal group IMG4.

In a case where time point t8 at which the rolling readout driving illustrated by straight line ROg4 ends is reached, the system controller 11 performs a control of executing the global shutter driving illustrated by straight line GSg1 with respect to the group G1. By this global shutter driving, charges are transferred from the photoelectric conversion units 61A to the charge holding units 61B at the same time in all of the pixel rows 62 of the group G1, and the charges are held in the charge holding units 61B as illustrated by straight line STg1. Accordingly, exposure ends at the same timing in all of the pixel rows 62 of the group G1.

In addition, after performing the control of executing the global shutter driving illustrated by straight line GSg1 at time point t8, the system controller 11 performs a control of executing the rolling readout driving illustrated by straight line ROG1. In this rolling readout driving, the pixel rows 62 of the group G1 are sequentially selected from the upper end toward the lower end of the light-receiving surface 60, and pixel signals are read out from the charge holding units 61B of the selected pixel row 62.

The system controller 11 causes the digital signal processing section 17 to process the pixel signals that are sequentially read out from the pixel rows 62 of the group G1 by the rolling readout driving which is started at time point t8 and which is illustrated by straight line ROG1. In a case where a line image is generated by this processing, the system controller 11 performs a control of displaying the line image on the display surface 22b. By this control, a live view image LV3 of the subject captured in a period F6 between time point t7 and time point t8 is displayed on the display surface 22b as illustrated by straight line DR4. In FIG. 5, a period between time point t6 and time point t7 is illustrated as a period F5. In addition, a period between time point t8 and time point t9 at which the rolling readout driving which is started at time point t8 and which is illustrated by straight line ROG1 ends is illustrated as a period F7.

At time point t8, the digital signal processing section 17 generates the captured image data by processing the pixel signal group IMG1, the pixel signal group IMG2, the pixel signal group IMG3, and the pixel signal group IMG4 read out between time point t2 and time point t8, and stores the captured image data in the storage medium 21.

In FIG. 5, a control of executing driving illustrated by straight line GR and by straight line GS constitutes a first control. In addition, a control of executing driving illustrated by straight line ROg1 in the period F1 constitutes a second control. In addition, each of a control of executing driving illustrated by straight line ROg2, straight line GRg1, and straight line GSg1 in the period F2, a control of executing driving illustrated by straight line ROg3, straight line GRg1, and straight line GSg1 in the period F4, and a control of executing driving illustrated by straight line ROg4, straight line GRg1, and straight line GSg1 in the period F6 constitutes a third control. In addition, each of a control of executing driving illustrated by straight line ROG1 in the period F3, a control of executing driving illustrated by straight line ROG1 in the period F5, and a control of executing driving illustrated by straight line ROG1 in the period F7 constitutes a fourth control.

As described above, according to the digital camera 100, even in a case where a total number of pixels 61 formed on the light-receiving surface 60 is large, and time is required until the readout of the pixel signals from all of the pixels 61 is completed, the postview image PV can be displayed before the readout of all pixel signals is completed, that is, specifically, shortly after time point t2 illustrated in FIG. 5. Thus, a state of the subject imaged in the exposure period EX can be instantly checked, and convenience of use can be improved.

In addition, according to the digital camera 100, even after the postview image PV is displayed, imaging (exposure in the period F2, the period F4, and the period F6 in FIG. 5) for generating the live view image can be performed using the group G1 in which the readout of the pixel signals is already completed. By this imaging, it is possible to display the live view image before the readout of all pixel signals obtained by the main imaging is completed, and furthermore, to update the live view image. Thus, the user can continue checking the state of the subject to be imaged based on the postview image PV and on the live view image continuously displayed from the postview image PV, and can perform favorable imaging by having an appropriate chance to press a shutter.

It is preferable that in each of the period F1, the period F3, and the period F5 illustrated in FIG. 5, the system controller 11 reads out the pixel signals from a group that includes the second pixel row including the phase difference detection pixel. That is, in the above description, it is preferable that the second pixel row is included in the group G1.

By reading out the pixel signals from the second pixel row in each of the period F1, the period F3, and the period F5, the system controller 11 can derive an evaluation value (a value for evaluating an amount of shift between a main subject and the focal position; for example, a defocus amount) for focal point adjustment using the pixel signal read out from the phase difference detection pixel. Accordingly, for example, in each of a period from time point t3 to time point t5, a period from time point t5 to time point t7, and a period from time point t7 to time point t9, it is possible to derive the evaluation value and to perform control of the focus lens, prediction of a subject position, and the like based on the evaluation value. Consequently, focal point adjustment can be performed at a high speed with high accuracy before the subsequent main imaging is started. Particularly, in a continuous shooting mode in which the main imaging is continuously performed a plurality of times in accordance with the imaging instruction, the evaluation value can be derived with high frequency. Thus, quality of a captured image can be improved.

The pixel signals from the group including the second pixel row may be read out in at least one of the period F2 or the period F4 instead of the period F1, the period F3, and the period F5. Even in this case, focal point adjustment in the subsequent main imaging can be performed at a high speed with high accuracy.

In the operation illustrated in FIG. 5, the display of the postview image PV may be omitted. Even in this case, the state of the subject can be checked immediately after the main imaging based on the live view image LV1 and on the live view image LV2.

In addition, in the operation illustrated in FIG. 5, the display of the live view image LV1 may be omitted. In this case, the postview image PV can be displayed longer, and the subject imaged in the main imaging can be checked in detail.

In addition, in the operation illustrated in FIG. 5, the display of the live view image LV1, the live view image LV2, and the live view image LV3 may be omitted. Even in this case, for example, by performing subject detection processing or derivation processing of the evaluation value using the captured image data captured by the group G1 in each of the period F2, the period F4, and the period F6, it is possible to improve accuracy of motion prediction of a specific subject or to improve accuracy of a control of continuously focusing on the specific subject.

Even in a case where the postview image PV, the live view image LV1, the live view image LV2, and the live view image LV3 are displayed as illustrated in FIG. 5, for example, by performing the subject detection processing or the derivation processing of the evaluation value together using the captured image data captured by the group G1 in each of the period F2, the period F4, and the period F6, it is possible to improve the accuracy of the motion prediction of the specific subject or to improve the accuracy of the control of continuously focusing on the specific subject.

While the pixels 61 formed on the light-receiving surface 60 are classified into four groups in the above description, the pixels 61 may be classified into two or more groups. For example, in a configuration in which the group G4 is not present on the light-receiving surface 60, the processing illustrated in FIG. 5 may be changed by removing the processing of time point t7 and later.

In addition, for example, the group G1 and the group G3 may be combined as a first group, and the group G2 and the group G4 may be combined as a second group. In this case, the system controller 11 may perform a control of displaying the postview image by reading out the pixel signals from the first group in the period F1, perform a control of exposing the first group and of reading out the pixel signals from the second group in the period F2, and perform a control of displaying the live view image by reading out the pixel signals from the first group, performing the subject detection processing, or performing the derivation processing of the evaluation value in the period F3.

Hereinafter, modification examples of the operation of the digital camera 100 in the imaging mode will be described.

Figure 6:
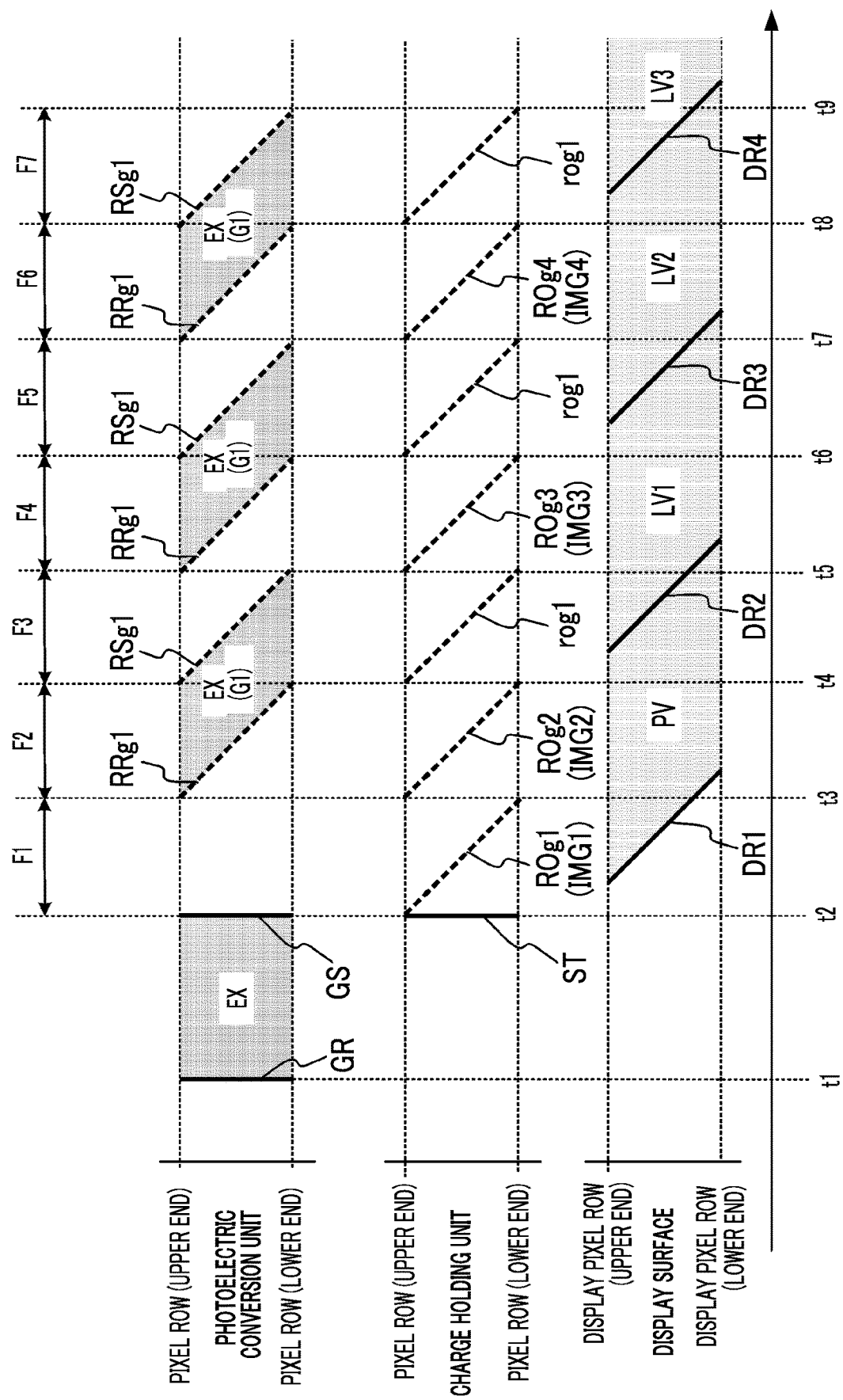
FIG. 6 is a timing chart illustrating a first modification example of the operation of the digital camera 100 illustrated in FIG. 1 in the imaging mode.

FIG. 6 is a timing chart illustrating a first modification example of the operation of the digital camera 100 illustrated in FIG. 1 in the imaging mode. The timing chart illustrated in FIG. 6 is the same as the timing chart illustrated in FIG. 5 except that the global reset driving illustrated by straight line GRg1 in FIG. 5 is changed to the rolling reset driving illustrated by straight line RRg1, the global shutter driving illustrated by straight line GSg1 in FIG. 5 is changed to the rolling shutter driving illustrated by straight line RSg1, straight line STg1 illustrated in FIG. 5 is removed, and the rolling readout driving illustrated by straight line ROG1 in FIG. 5 is changed to the rolling readout driving illustrated by straight line rog1.

The system controller 11 performs a control of executing the rolling reset driving illustrated by straight line RRg1 at time point t3. In this rolling reset driving, the pixel rows 62 of the group G1 are sequentially selected from the upper end side, and the photoelectric conversion units 61A in the selected pixel row 62 are reset.

In a case where the rolling reset driving ends at time point t4, the system controller 11 performs a control of executing the rolling shutter driving illustrated by straight line RSg1. In this rolling shutter driving, the pixel rows 62 of the group G1 are sequentially selected from the upper end side, and the charges accumulated in the photoelectric conversion units 61A in the selected pixel row 62 are transferred to the charge holding units 61B. In a case where charges are transferred to the charge holding units 61B by this rolling shutter driving, pixel signals corresponding to the charges are read out by the rolling readout driving illustrated by straight line rog1, and the live view image LV1 is displayed based on the pixel signals.

The system controller 11 also performs a control of executing the rolling reset driving with respect to the group G1 at time point t5, and in a case where this rolling reset driving ends at time point t6, performs a control of executing the rolling shutter driving with respect to the group G1. In a case where charges are transferred to the charge holding units 61B by this rolling shutter driving, pixel signals corresponding to the charges are read out by the rolling readout driving illustrated by straight line rog1, and the live view image LV2 is displayed based on the pixel signals.

The system controller 11 also performs a control of executing the rolling reset driving with respect to the group G1 at time point t7, and in a case where this rolling reset driving ends at time point t8, performs a control of executing the rolling shutter driving with respect to the group G1. In a case where charges are transferred to the charge holding units 61B by this rolling shutter driving, pixel signals corresponding to the charges are read out by the rolling readout driving illustrated by straight line rog1, and the live view image LV3 is displayed based on the pixel signals.

As described above, according to the processing illustrated in FIG. 6, a time required from the end of the exposure of each pixel row 62 of the group G1 illustrated by straight line RSg1 to the start of the display of the line image corresponding to each pixel row 62 can be uniform for all of the pixel rows 62 of the group G1. Thus, quality of the live view image LV1, the live view image LV2, and the live view image LV3 can be improved.

In the processing illustrated in FIG. 6, each of a control of executing driving illustrated by straight line ROg2, straight line RRg1, and straight line RSg1 in the period F2 and in the period F3, a control of executing driving illustrated by straight line ROg3, straight line RRg1, and straight line RSg1 in the period F4 and in the period F5, and a control of executing driving illustrated by straight line ROg4, straight line RRg1, and straight line RSg1 in the period F6 and in the period F7 constitutes the third control. In addition, a control of executing driving illustrated by straight line rog1 constitutes the fourth control.

Figure 7:
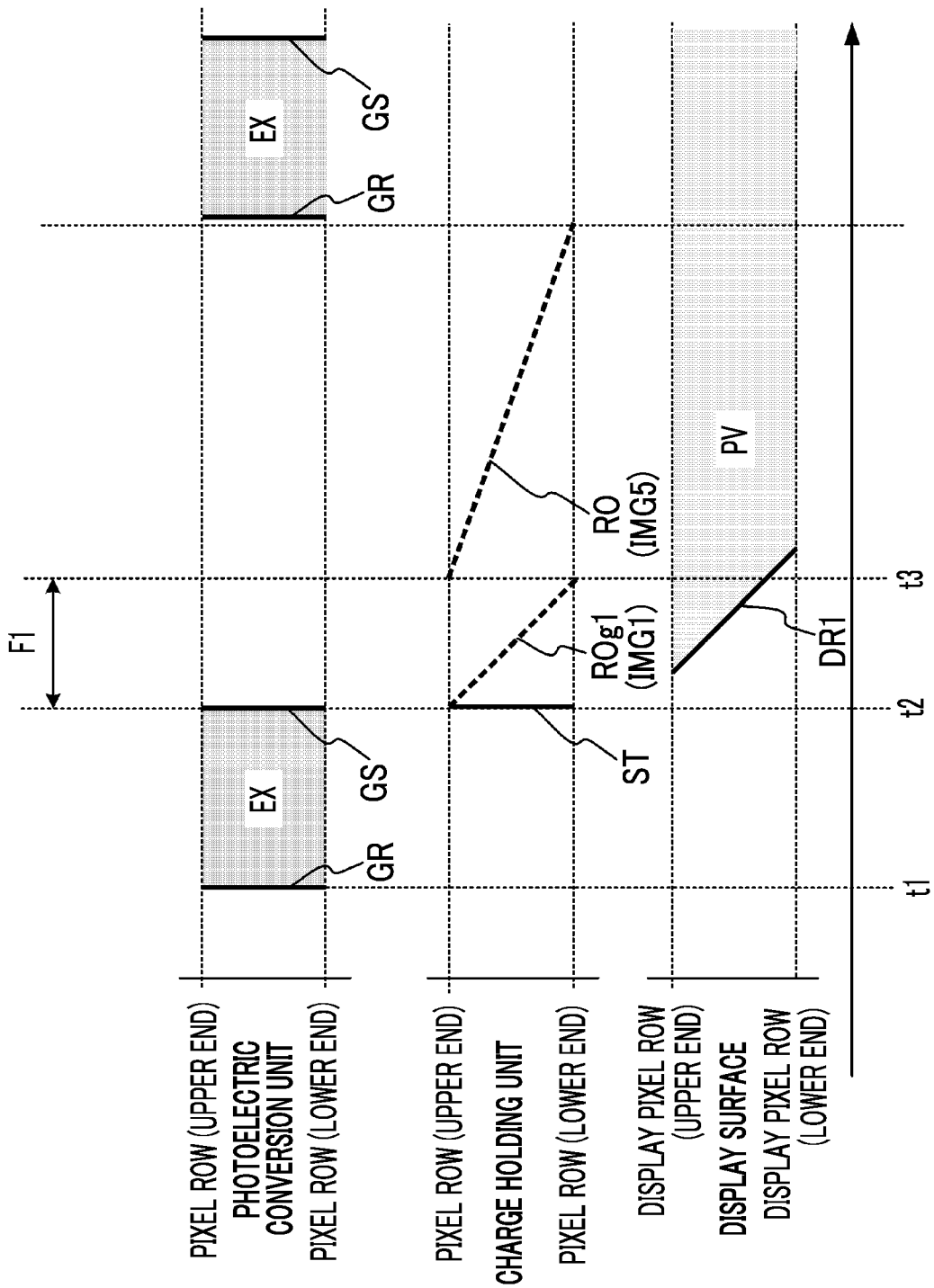
FIG. 7 is a timing chart illustrating a second modification example of the operation of the digital camera 100 illustrated in FIG. 1 in the imaging mode.

FIG. 7 is a timing chart illustrating a second modification example of the operation of the digital camera 100 illustrated in FIG. 1 in the imaging mode. In the timing chart illustrated in FIG. 7, the processing of time point t3 and later is different from that in FIG. 5. In addition, in the second modification example, it is assumed that the second pixel row is included in a group (group G1) in which pixel signals are initially read out after the main imaging.

The system controller 11 acquires the pixel signal of the phase difference detection pixel among the pixel signals read out from the group G1 by the rolling readout driving started in the period F1, and derives the evaluation value for focal point adjustment based on the pixel signal.

The system controller 11 determines whether to execute or not execute the control of time point t3 and later (that is, the third control and the fourth control) in FIG. 5 based on the derived evaluation value. Specifically, in a case where the evaluation value is less than a threshold value, the system controller 11 determines to execute the control of time point t3 and later in FIG. 5 and executes the control. The operation in this case is the same as illustrated in FIG. 5.

On the other hand, in a case where the evaluation value is greater than or equal to the threshold value, the system controller 11 determines not to execute the control of time point t3 and later in FIG. 5 and, as illustrated in FIG. 7, performs a control of executing the rolling readout driving illustrated by straight line RO instead of the third control and of the fourth control. In this rolling readout driving, the pixel rows 62 included in the group G2, the group G3, and the group G4 are sequentially selected from the upper end toward the lower end of the light-receiving surface 60, and pixel signals are read out from the charge holding units 61B of the selected pixel row 62.

The control of executing the rolling readout driving illustrated by straight line RO constitutes a fifth control.

A pixel signal group read out from the group G2, the group G3, and the group G4 by the rolling readout driving illustrated by straight line RO will be referred to as a pixel signal group IMG5.

In a case where the rolling readout driving illustrated by straight line RO ends, the digital signal processing section 17 generates the captured image data by processing the pixel signal group IMG1 and the pixel signal group IMG5 read out from the imaging element 5, and stores the captured image data in the storage medium 21. In a case where the rolling readout driving illustrated by straight line RO ends, the system controller 11 starts the subsequent main imaging.

In a case where the evaluation value derived based on the pixel signals read out from the group G1 in the period F1 is high, it is estimated that a degree of blurriness of the captured image data obtained by the main imaging is high. Accordingly, in such a case, a time until the subsequent main imaging can be performed can be shortened by reading out pixel signals from the group G2, the group G3, and the group G4 at once instead of reading out pixel signals from the group G2, the group G3, and the group G4 in separate periods and of performing imaging based on the group G1 between each readout. Consequently, it is possible to perform favorable imaging by having an appropriate chance to press the shutter.

In the operation example illustrated in FIG. 7, in a case where the evaluation value derived based on the pixel signals read out from the group G1 is greater than or equal to the threshold value, the rolling readout driving illustrated by straight line RO is performed.

As a modification example, in a case where the evaluation value is greater than or equal to the threshold value, the system controller 11 may stop reading out pixel signals from the group G2, the group G3, and the group G4 and perform a control of performing the subsequent main imaging (that is, the first control).

Figure 8:
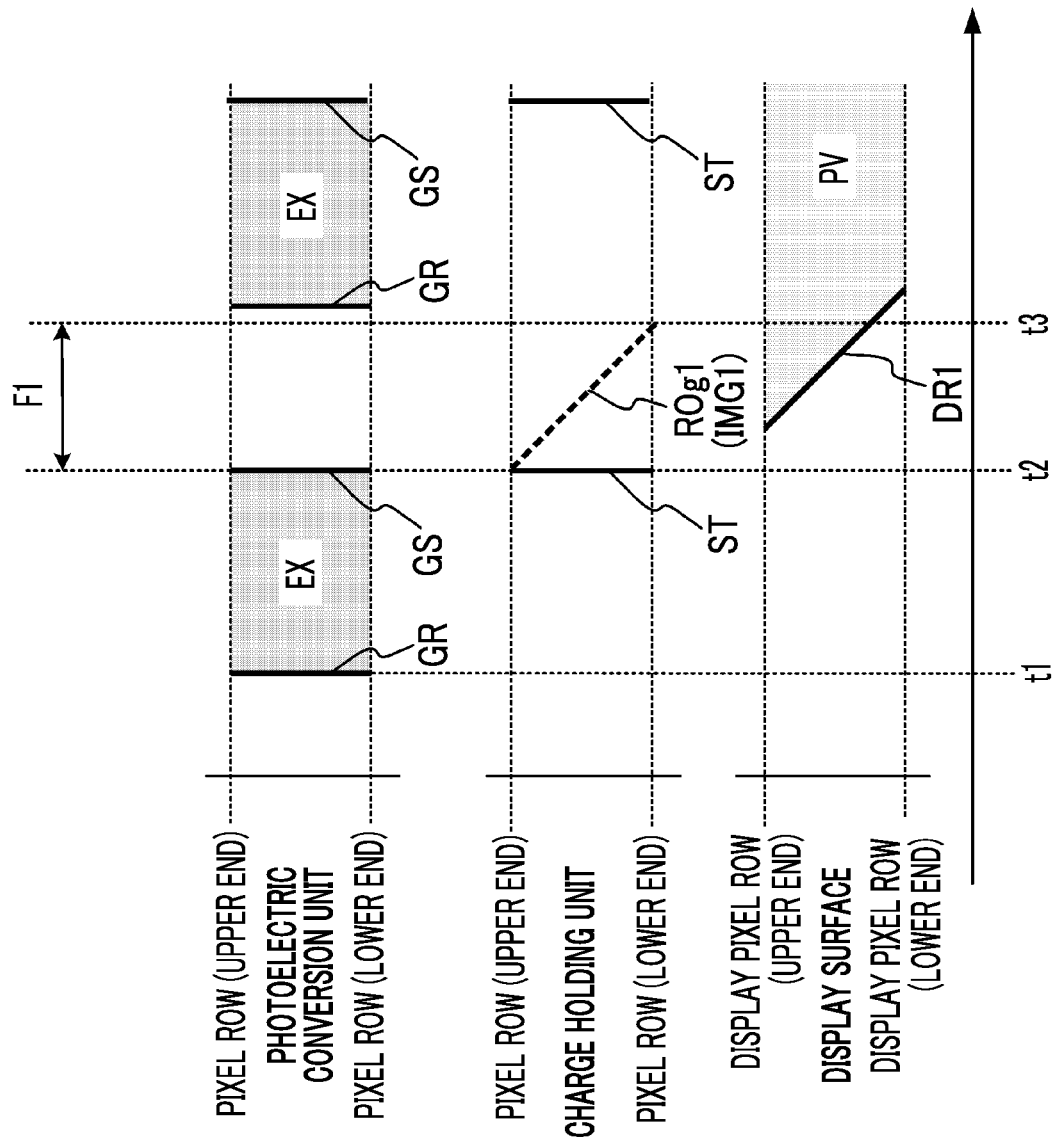
FIG. 8 is a timing chart illustrating a third modification example of the operation of the digital camera 100 illustrated in FIG. 1 in the imaging mode.

FIG. 8 is a timing chart illustrating a third modification example of the operation of the digital camera 100 illustrated in FIG. 1 in the imaging mode. The timing chart illustrated in FIG. 8 is different from FIG. 7 in that the system controller 11 stops reading out pixel signals from the group G2, the group G3, and the group G4 at time point t3 and then, performs a control of starting the subsequent main imaging.

In FIG. 8, after the end of the exposure period EX started after time point t3, for example, the processing of time point t3 and later illustrated in FIG. 5 is performed in a case where the evaluation value derived based on the pixel signals read out from the group G1 exposed in the exposure period EX is less than the threshold value, and the subsequent main imaging is performed in a case where the evaluation value is greater than or equal to the threshold value. Even in the case in FIG. 8, it is possible to shorten a time until the subsequent main imaging can be performed, and to perform favorable imaging by having an appropriate chance to press the shutter.

Figure 9:
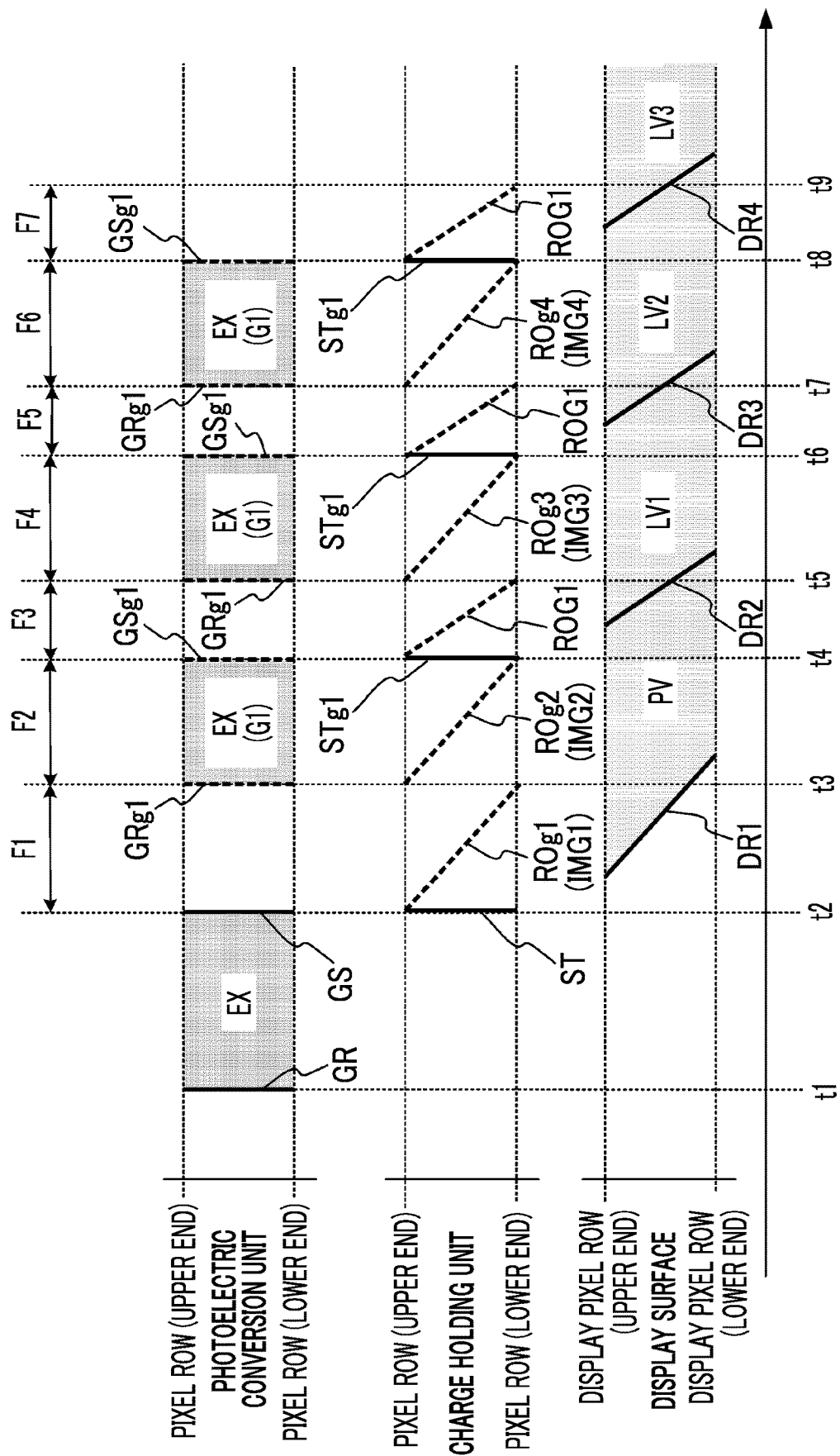
FIG. 9 is a timing chart illustrating a fourth modification example of the operation of the digital camera 100 illustrated in FIG. 1 in the imaging mode.

FIG. 9 is a timing chart illustrating a fourth modification example of the operation of the digital camera 100 illustrated in FIG. 1 in the imaging mode. The timing chart illustrated in FIG. 9 is different from FIG. 5 in that a length of each of the period F3, the period F5, and the period F7 is shorter than a length of each of the period F1, the period F2, the period F4, and the period F6.

That is, in the timing chart illustrated in FIG. 9, a readout speed of pixel signals by the rolling readout driving illustrated by straight line ROG1 is higher than a readout speed of pixel signals by the rolling readout driving illustrated by each of straight line ROg1, straight line ROg2, straight line ROg3, and straight line ROg4.

Changing of the readout speed of pixel signals from the imaging element 5 can be performed by, for example, changing the number of conversion bits set in an analog to digital (AD) converter included in the signal processing circuit 64 or by changing a clock frequency of the AD converter. In addition, the readout speed can also be changed by changing the number of pixels 61 in which pixel signals are read out from the group G1.

According to the processing illustrated in FIG. 9, it is possible to shorten a time until the readout of all pixel signals obtained by the main imaging is completed, and to start the subsequent main imaging quickly. In the continuous shooting mode, a continuous shooting speed can be increased.

A control of increasing the readout speed of pixel signals in the period F3, the period F5, and the period F7 as illustrated in FIG. 9 may be performed at all times or may be performed only in a case where the evaluation value is greater than or equal to the threshold value.

That is, in a case where the evaluation value derived based on the pixel signals read out from the group G1 including the phase difference detection pixel in the period F1 is greater than or equal to the threshold value, the system controller 11 may execute the control of increasing the speed. In a case where the evaluation value is less than the threshold value, the system controller 11 may not execute the control of increasing the speed so that the readout speed of pixel signals in the period F3, the period F5, and the period F7 are the same as the readout speed of pixel signals in the period F1, the period F2, the period F4, and the period F6.

By doing so, a time until the subsequent main imaging can be performed can be shortened in a case where significant blurriness occurs in the subject image captured by the main imaging. On the other hand, in a case where significant blurriness does not occur in the subject image captured by the main imaging, it is possible to display the postview image and the live view image under the same condition or to increase image quality of the live view image, and it is possible to favorably observe the subject being imaged.

Figure 10:
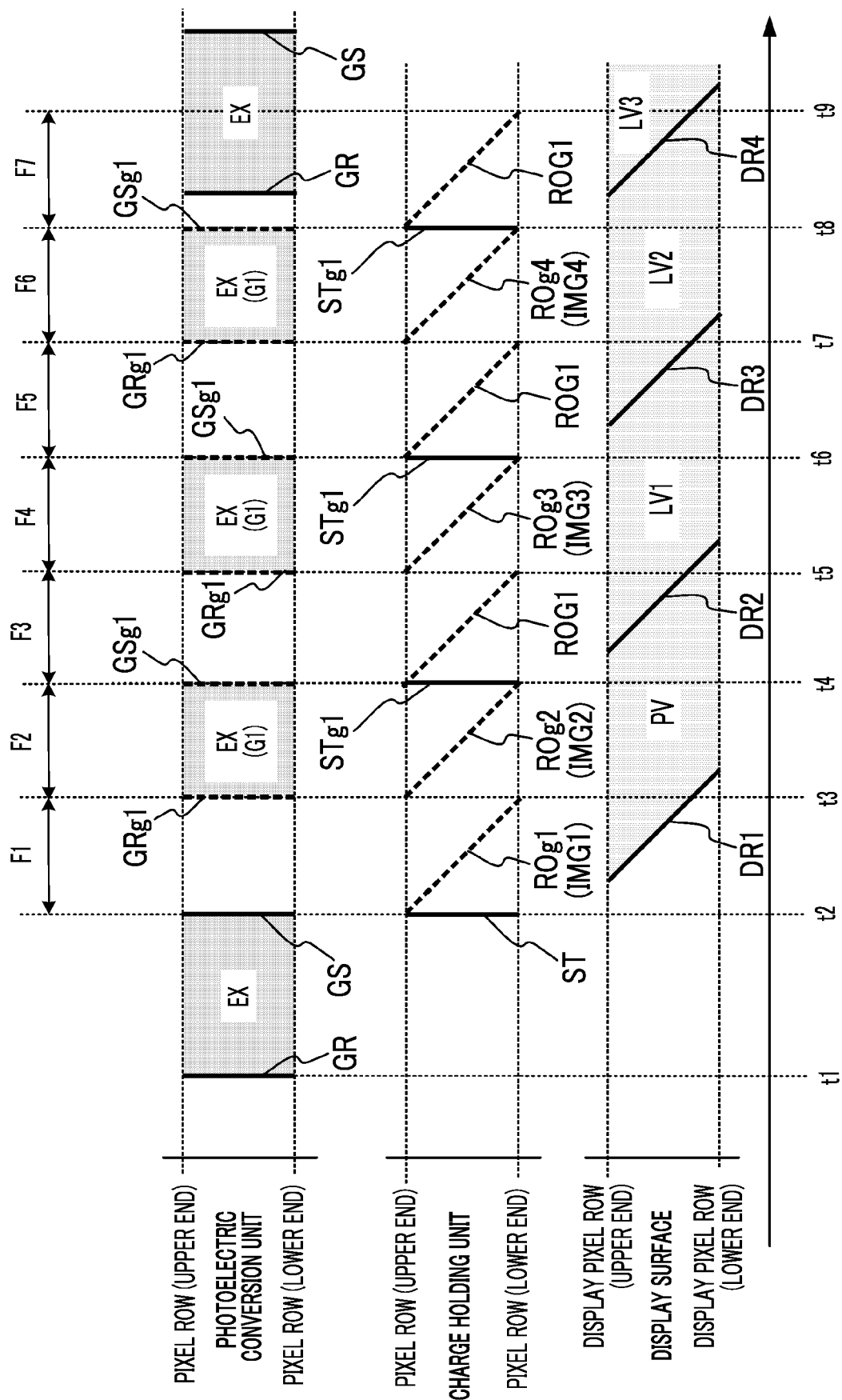
FIG. 10 is a timing chart illustrating a fifth modification example of the operation of the digital camera 100 illustrated in FIG. 1 in the imaging mode.

FIG. 10 is a timing chart illustrating a fifth modification example of the operation of the digital camera 100 illustrated in FIG. 1 in the imaging mode. The timing chart illustrated in FIG. 10 is the same as the timing chart illustrated in FIG. 5 except that the subsequent main imaging is started in the period F7.

In the timing chart illustrated in FIG. 10, in a case where the rolling readout driving illustrated by straight line ROg4 ends at time point t8, the system controller 11 performs a control of executing the subsequent main imaging (that is, the first control) in parallel with a control of executing the rolling readout driving illustrated by straight line ROG1.

In FIG. 10, operation after the end of the exposure period EX started after time point t8 is the same as the operation from time point t2 to time point t9. According to the processing illustrated in FIG. 10, it is possible to shorten a time until the subsequent main imaging, and the continuous shooting speed can be increased in the continuous shooting mode. In FIG. 10, driving illustrated by straight line GRg1 and by straight line GSg1 in the period F6 and driving illustrated by straight line ROG1 in the period F7 are not essential and can be omitted.

Figure 11:
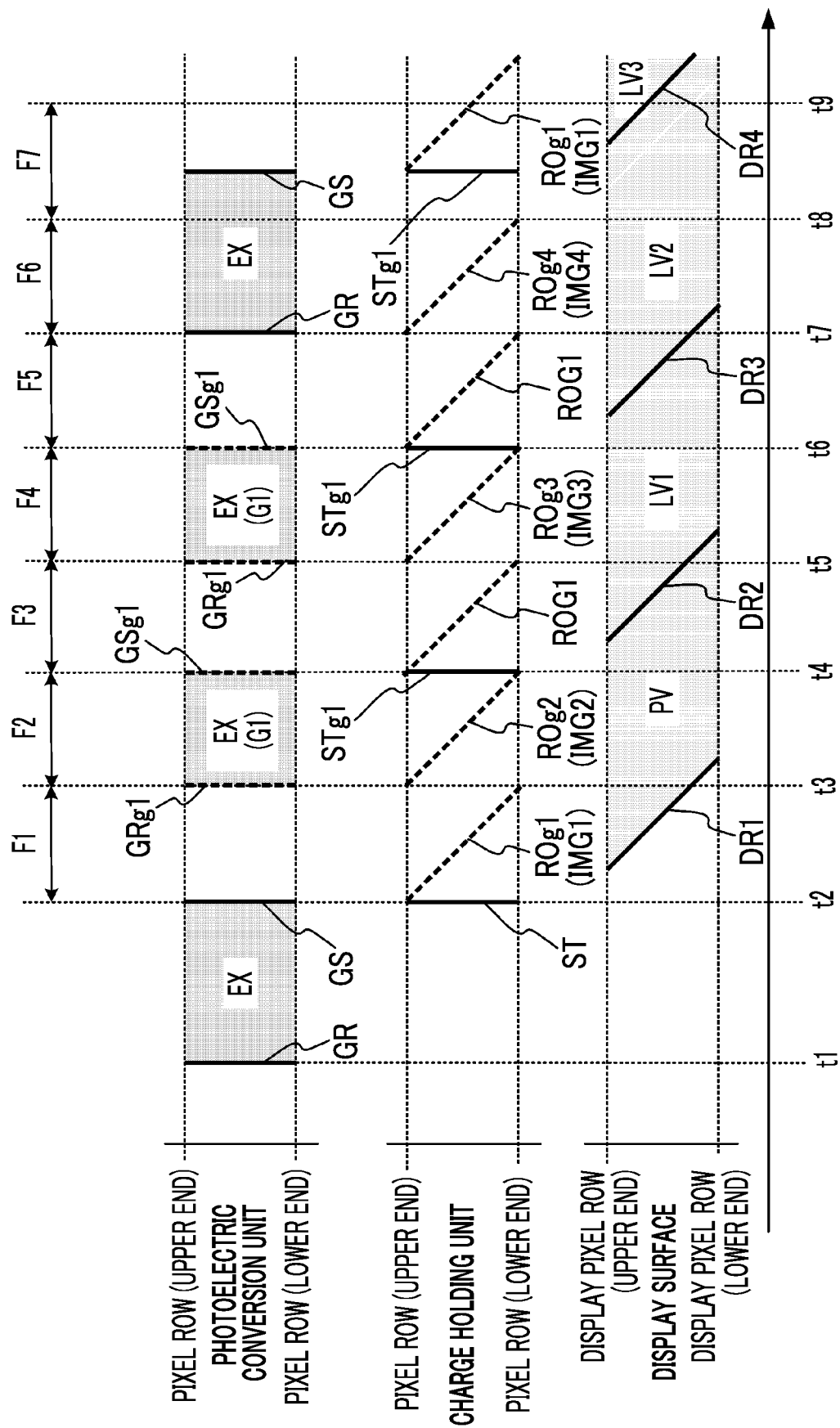
FIG. 11 is a timing chart illustrating a sixth modification example of the operation of the digital camera 100 illustrated in FIG. 1 in the imaging mode.

FIG. 11 is a timing chart illustrating a sixth modification example of the operation of the digital camera 100 illustrated in FIG. 1 in the imaging mode. The timing chart illustrated in FIG. 11 is the same as the timing chart illustrated in FIG. 5 except that the exposure of the group G1 in the period F6 and the readout of pixel signals obtained by the exposure in the period F7 are removed, and that the subsequent main imaging is started at time point t7.

In the timing chart illustrated in FIG. 11, in a case where the rolling readout driving illustrated by straight line ROG1 ends at time point t7, the system controller 11 performs a control of executing the rolling readout driving illustrated by straight line ROg4 (that is, the fourth control) in parallel with a control of executing the subsequent main imaging (that is, the first control). Operation after the end of the exposure period EX started at time point t7 is the same as the operation from time point t2 to time point t8. According to the processing illustrated in FIG. 11, it is possible to shorten a time until the subsequent main imaging, and the continuous shooting speed can be increased in the continuous shooting mode.

Next, a configuration of a smartphone that is another embodiment of the imaging apparatus according to the present invention will be described.

Figure 12:
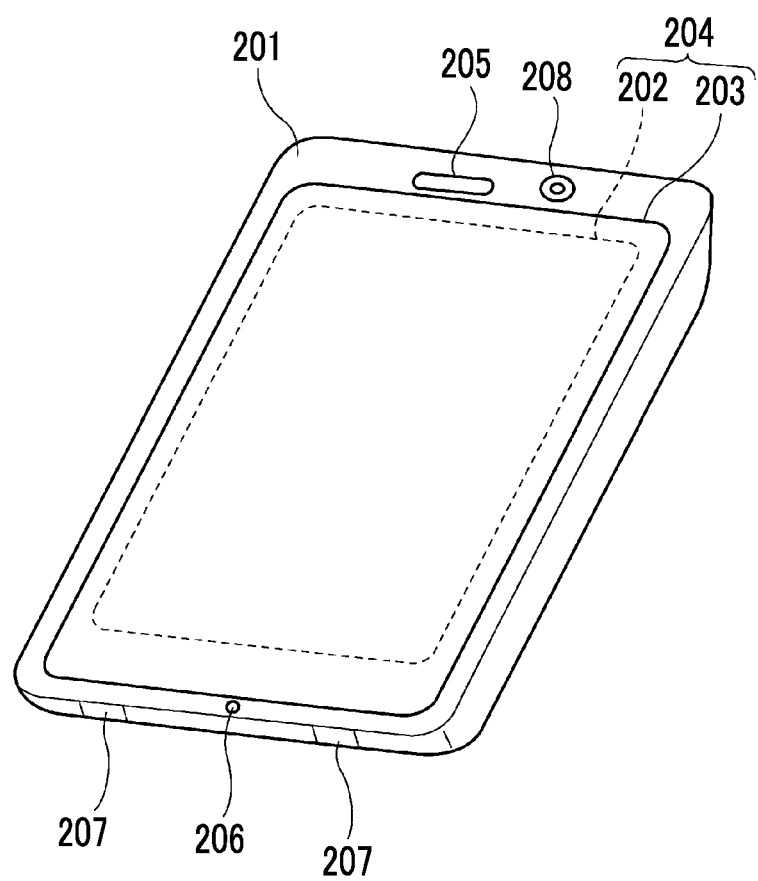
FIG. 12 illustrates an exterior of a smartphone 200.

FIG. 12 illustrates an exterior of a smartphone 200. The smartphone 200 illustrated in FIG. 12 includes a casing 201 having a flat plate shape and comprises a display and input unit 204 in which a display panel 202 as a display unit and an operation panel 203 as an input unit are integrated on one surface of the casing 201.

The casing 201 comprises a speaker 205, a microphone 206, an operation unit 207, and a camera unit 208. The configuration of the casing 201 is not limited thereto and can employ, for example, a configuration in which the display unit and the input unit are independently disposed, or a configuration that has a folded structure or a sliding mechanism.

Figure 13:
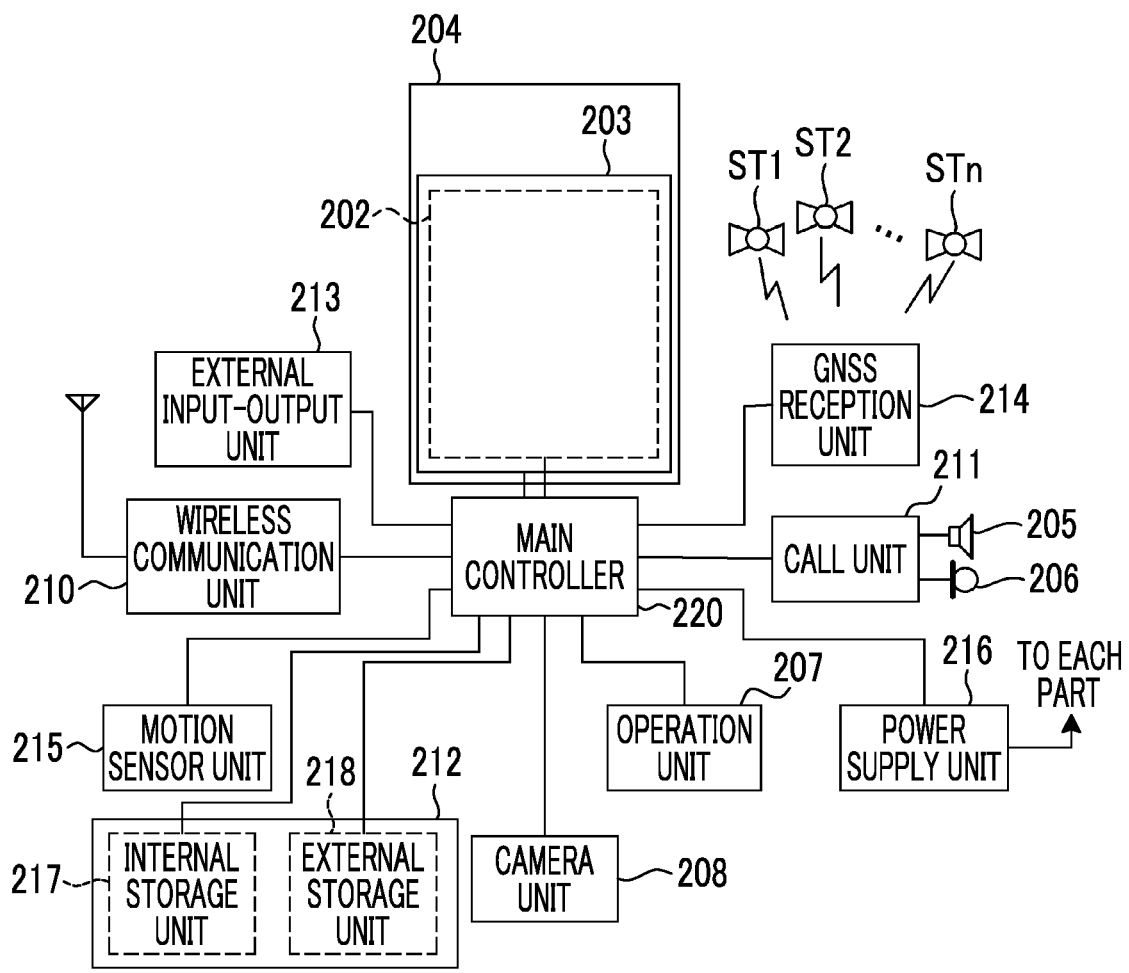
FIG. 13 is a block diagram illustrating a configuration of the smartphone 200 illustrated in FIG. 12.

FIG. 13 is a block diagram illustrating a configuration of the smartphone 200 illustrated in FIG. 12.

As illustrated in FIG. 13, a wireless communication unit 210, the display and input unit 204, a call unit 211, the operation unit 207, the camera unit 208, a storage unit 212, an external input-output unit 213, a global navigation satellite system (GNSS) reception unit 214, a motion sensor unit 215, a power supply unit 216, and a main controller 220 are comprised as main constituents of the smartphone.

In addition, a wireless communication function of performing mobile wireless communication with a base station apparatus BS, not illustrated, through a mobile communication network NW, not illustrated, is provided as a main function of the smartphone 200.

The wireless communication unit 210 performs wireless communication with the base station apparatus BS accommodated in the mobile communication network NW in accordance with an instruction from the main controller 220. By using the wireless communication, transmission and reception of various file data such as audio data and image data, electronic mail data, or the like and reception of web data, streaming data, or the like are performed.

The display and input unit 204 is a so-called touch panel that visually delivers information to the user by displaying images (still images and video images), text information, or the like and that detects a user operation with respect to the displayed information under control of the main controller 220. The display and input unit 204 comprises the display panel 202 and the operation panel 203.

The display panel 202 uses a liquid crystal display (LCD), an organic electro-luminescence display (OELD), or the like as a display device.

The operation panel 203 is a device that is placed such that an image displayed on a display surface of the display panel 202 can be visually recognized, and that detects one or a plurality of coordinates operated with a finger of the user or with a stylus. In a case where the device is operated with the finger of the user or with the stylus, a detection signal generated by the operation is output to the main controller 220. Next, the main controller 220 detects an operation position (coordinates) on the display panel 202 based on the received detection signal.

As illustrated in FIG. 13, while the display panel 202 and the operation panel 203 of the smartphone 200 illustrated as one embodiment of the imaging apparatus according to the present invention are integrated to constitute the display and input unit 204, the operation panel 203 is disposed to completely cover the display panel 202.

In a case where such disposition is employed, the operation panel 203 may have a function of detecting the user operation even in a region outside the display panel 202. In other words, the operation panel 203 may comprise a detection region (hereinafter, referred to as a display region) for an overlapping part overlapping with the display panel 202 and a detection region (hereinafter, referred to as a non-display region) for an outer edge part, other than the overlapping part, that does not overlap with the display panel 202.

A size of the display region and a size of the display panel 202 may completely match, but both sizes do not need to match. In addition, the operation panel 203 may comprise two sensitive regions of the outer edge part and an inner part other than the outer edge part. Furthermore, a width of the outer edge part is appropriately designed depending on a size and the like of the casing 201.

Furthermore, examples of a position detection method employed in the operation panel 203 include a matrix switch method, a resistive membrane system, a surface acoustic wave method, an infrared method, an electromagnetic induction method, and a capacitance method. Any of the methods can be employed.

The call unit 211 comprises the speaker 205 or the microphone 206, and converts voice of the user input through the microphone 206 into audio data processable in the main controller 220 and outputs the audio data to the main controller 220, or decodes audio data received by the wireless communication unit 210 or by the external input-output unit 213 and outputs the decoded audio data from the speaker 205.

In addition, as illustrated in FIG. 12, for example, the speaker 205 can be mounted on the same surface as a surface on which the display and input unit 204 is provided, and the microphone 206 can be mounted on a side surface of the casing 201.

The operation unit 207 is a hardware key that uses a key switch or the like, and receives an instruction from the user. For example, as illustrated in FIG. 12, the operation unit 207 is a push button-type switch that is mounted on a side surface of the casing 201 of the smartphone 200, and that is set to an ON state in a case where the switch is pressed with the finger or the like and is set to an OFF state by restoring force of a spring or the like in a case where the finger is released.

In the storage unit 212, a control program and control data of the main controller 220, application software, address data in which a name, a telephone number, or the like of a communication counterpart is associated, transmitted and received electronic mail data, web data downloaded by web browsing, and downloaded contents data are stored, and streaming data or the like is temporarily stored. In addition, the storage unit 212 is configured with an internal storage unit 217 incorporated in the smartphone and with an external storage unit 218 that includes a slot for an attachable and detachable external memory.

Each of the internal storage unit 217 and the external storage unit 218 constituting the storage unit 212 is implemented using a storage medium such as a memory (for example, a MicroSD (registered trademark) memory) of a flash memory type, a hard disk type, a multimedia card micro type, or a card type, a random access memory (RAM), or a read only memory (ROM).

The external input-output unit 213 functions as an interface with all external apparatuses connected to the smartphone 200 and is directly or indirectly connected to other external apparatuses by communication or the like (for example, a universal serial bus (USB), IEEE1394, Bluetooth (registered trademark), radio frequency identification (RFID), infrared communication (Infrared Data Association (IrDA) (registered trademark)), Ultra Wideband (UWB) (registered trademark), or ZigBee (registered trademark)) or through a network (for example, Ethernet (registered trademark) or a wireless local area network (LAN)).

For example, the external apparatuses connected to the smartphone 200 include a wired/wireless headset, a wired/wireless external charger, a wired/wireless data port, a memory card and a subscriber identity module (SIM)/user identity module (UIM) card connected through a card socket, an external audio and video apparatus connected through an audio and video input/output (I/O) terminal, a wirelessly connected external audio and video apparatus, a smartphone connected in a wired/wireless manner, a personal computer connected in a wired/wireless manner, and an earphone connected in a wired/wireless manner.

The external input-output unit 213 can deliver data transferred from the external apparatuses to each constituent in the smartphone 200 or transfer data in the smartphone 200 to the external apparatuses.

The GNSS reception unit 214 receives GNSS signals transmitted from GNSS satellites ST1 to STn, executes positioning computation processing based on the received plurality of GNSS signals, and detects a position consisting of a latitude, a longitude, and an altitude of the smartphone 200 in accordance with an instruction from the main controller 220.

In a case where positional information can be acquired from the wireless communication unit 210 or from the external input-output unit 213 (for example, a wireless LAN), the GNSS reception unit 214 can detect the position using the positional information.

The motion sensor unit 215 comprises, for example, a three-axis acceleration sensor and detects a physical motion of the smartphone 200 in accordance with an instruction from the main controller 220. By detecting the physical motion of the smartphone 200, a movement direction or acceleration of the smartphone 200 is detected. A detection result is output to the main controller 220.

The power supply unit 216 supplies power stored in a battery (not illustrated) to each part of the smartphone 200 in accordance with an instruction from the main controller 220.

The main controller 220 comprises a microprocessor, operates in accordance with the control program and with the control data stored in the storage unit 212, and generally controls each part of the smartphone 200. The microprocessor of the main controller 220 has the same function as the system controller 11. In addition, the main controller 220 has a mobile communication control function of controlling each part of a communication system and an application processing function in order to perform voice communication or data communication through the wireless communication unit 210.

The application processing function is implemented by operating the main controller 220 in accordance with the application software stored in the storage unit 212. For example, the application processing function is an infrared communication function of performing data communication with counter equipment by controlling the external input-output unit 213, an electronic mail function of transmitting and receiving electronic mails, or a web browsing function of viewing a web page.

In addition, the main controller 220 has an image processing function such as displaying an image on the display and input unit 204 based on image data (data of a still image or of a video image) such as reception data or downloaded streaming data.

The image processing function refers to a function of causing the main controller 220 to decode the image data, perform image processing on the decoding result, and display the image on the display and input unit 204.

Furthermore, the main controller 220 executes a display control of the display panel 202 and an operation detection control of detecting the user operation performed through the operation unit 207 and through the operation panel 203.

By executing the display control, the main controller 220 displays an icon for starting the application software or for a software key such as a scroll bar or displays a window for creating an electronic mail.

The scroll bar refers to a software key for receiving an instruction to move a display part of a large image or the like that does not fit in the display region of the display panel 202.

In addition, by executing the operation detection control, the main controller 220 detects the user operation performed through the operation unit 207, receives an operation with respect to the icon and an input of a text string in an input field of the window through the operation panel 203, or receives a request for scrolling the display image made through the scroll bar.

Furthermore, by executing the operation detection control, the main controller 220 is provided with a touch panel control function of determining whether the operation position on the operation panel 203 is in the overlapping part (display region) overlapping with the display panel 202 or is in the other outer edge part (non-display region) not overlapping with the display panel 202 and of controlling the sensitive region of the operation panel 203 or a display position of the software key.

In addition, the main controller 220 can detect a gesture operation with respect to the operation panel 203 and execute a function set in advance in accordance with the detected gesture operation.

The gesture operation is not a simple touch operation in the related art and means an operation of drawing a path with the finger or the like, designating a plurality of positions at the same time, or as a combination thereof, drawing a path for at least one of the plurality of positions.

The camera unit 208 includes the lens device 40, the imaging element 5, and the digital signal processing section 17 illustrated in FIG. 1. In the smartphone 200, the main controller 220 and the internal storage unit 217 constitute the imaging control device.

Captured image data generated by the camera unit 208 can be stored in the storage unit 212 or be output through the external input-output unit 213 or through the wireless communication unit 210.

In the smartphone 200 illustrated in FIG. 13, the camera unit 208 is mounted on the same surface as the display and input unit 204. However, a mount position of the camera unit 208 is not limited thereto. The camera unit 208 may be mounted on a rear surface of the display and input unit 204.

In addition, the camera unit 208 can be used in various functions of the smartphone 200. For example, an image acquired by the camera unit 208 can be displayed on the display panel 202, or the image of the camera unit 208 can be used as an operation input of the operation panel 203.

In addition, in detecting the position via the GNSS reception unit 214, the position can be detected by referring to the image from the camera unit 208. Furthermore, by referring to the image from the camera unit 208, it is possible to determine an optical axis direction of the camera unit 208 of the smartphone 200 or to determine the current use environment without using the three-axis acceleration sensor or by using the three-axis acceleration sensor together. The image from the camera unit 208 can also be used in the application software.

In addition, image data of a still image or of a video image to which the positional information acquired by the GNSS reception unit 214, voice information (may be text information acquired by performing voice to text conversion via the main controller or the like) acquired by the microphone 206, posture information acquired by the motion sensor unit 215, or the like is added can be stored in the storage unit 212 or be output through the external input-output unit 213 or through the wireless communication unit 210. Even with the smartphone 200 having the above configuration, the same effect as the digital camera 100 can be obtained.

EXPLANATION OF REFERENCES

1: imaging lens
2: stop
4: lens controller
5: imaging element
8: lens drive unit
9: stop drive unit
11: system controller
14, 207: operation unit
15: memory controller
16: memory
17: digital signal processing section
20: external memory controller
21: storage medium
22a: display controller
22b: display surface
22: display device
24: control bus
25: data bus
40: lens device
50: light-receiving surface
61A: photoelectric conversion unit
61B: charge holding unit
61C: charge transfer unit
61D: floating diffusion
61E: circuit
61: pixel
62: pixel row
63: drive circuit
64: signal processing circuit
65: signal line
70: N-type substrate
71: P-well layer
72: electrode
73: N-type impurity layer
74: P-type impurity layer
75: region
76: transfer electrode
77: reset transistor
78: output transistor
79: selection transistor
100A: body part
100: digital camera
GR, GS, GRg1, GSg1, RRg1, RSg1, RO: straight line
ST, ROg1, ROg2, ROg3, ROg4, ROG1, rog1: straight line
DR1, DR2, DR3, DR4: straight line
200: smartphone
201: casing
202: display panel
203: operation panel
204: display and input unit
205: speaker
206: microphone
208: camera unit
210: wireless communication unit
211: call unit
212: storage unit
213: external input-output unit
214: GNSS reception unit
215: motion sensor unit
216: power supply unit
217: internal storage unit
218: external storage unit
220: main controller

What is claimed is:

1. An imaging control device that controls an imaging element including a plurality of pixel rows in each of which a plurality of pixels each including a photoelectric conversion unit and a charge holding unit which holds charges transferred from the photoelectric conversion unit are arranged in one direction, the imaging control device comprising:

a processor,
wherein the processor is configured to:
perform a first control of exposing the plurality of pixel rows and of transferring charges accumulated in the photoelectric conversion units of the plurality of pixel rows by the exposing to the charge holding units;
perform a second control of reading out a signal corresponding to the charges held in the charge holding units of a part of the pixel rows among the charge holding units in which the charges are held by the first control;

perform a third control of reading out a signal corresponding to the charges held in the charge holding units of the pixel rows other than the part of the pixel rows among the charge holding units in which the charges are held by the first control, and of exposing the part of the pixel rows from which the signal is read out by the second control; and perform a fourth control of reading out a signal corresponding to the charges held in the charge holding units of the part of the pixel rows from which the signal is read out by the second control.

2. The imaging control device according to claim 1, wherein the processor is configured to perform a display control of a live view image based on a result of one or both of the second control and the fourth control.

3. The imaging control device according to claim 1, wherein the processor is configured to, in the third control, expose the part of the pixel rows by shifting exposure periods of all or a part of the part of the pixel rows.

4. The imaging control device according to claim 1, wherein the imaging element includes a phase difference detection pixel row that is the pixel row including a phase difference detection pixel, the part of the pixel rows includes the phase difference detection pixel row, and the processor is configured to derive an evaluation value for focal point adjustment based on a signal that is read out from the charge holding units of the phase difference detection pixel row by the second control.

5. The imaging control device according to claim 4, wherein the processor is configured to determine whether to execute or not execute the third control based on the evaluation value.

6. The imaging control device according to claim 5, wherein the processor is configured to not execute the third control in a case where the evaluation value is greater than or equal to a threshold value.

7. The imaging control device according to claim 5, wherein the processor is configured to, in a case of not executing the third control, perform, instead of the third control and of the fourth control, a fifth control of reading out a signal corresponding to the charges held in the charge holding units of the pixel rows other than the part of the pixel rows among the charge holding units in which the charges are held by the first control.

8. The imaging control device according to claim 5, wherein the processor is configured to, in a case of not executing the third control, perform the first control instead of the third control and of the fourth control.

9. The imaging control device according to claim 4, wherein the processor is configured to control a readout speed of the signal in the fourth control based on the evaluation value.

10. The imaging control device according to claim 9, wherein the processor is configured to, in a case where the evaluation value is greater than or equal to a threshold value, set the readout speed of the signal in the fourth control to be higher than a readout speed of the signal in the third control.

11. The imaging control device according to claim 1, wherein the processor is configured to set a readout speed of the signal in the fourth control to be higher than a readout speed of the signal in the third control.

12. The imaging control device according to claim 1, wherein the processor is configured to, after the second control is performed, perform, at least once, processing of performing the third control and the fourth control in this order.

13. The imaging control device according to claim 12, wherein the processor is configured to, in a case where the readout of the signal from the charge holding units of the pixel rows other than the part of the pixel rows is completed by the third control, start the first control by omitting the fourth control that is to be performed subsequently to the third control, or together with the fourth control.

14. The imaging control device according to claim 12, wherein the processor is configured to perform the processing n times with n being a plural number and, after the processing performed for the n-th time, perform the first control and a control of reading out a signal corresponding to the charges held in the charge holding units in a pixel row in which signal readout is not completed among the pixel rows other than the part of the pixel rows.

15. An imaging apparatus comprising:
the imaging control device according to claim 1; and
the imaging element.

16. An imaging control method for controlling an imaging element including a plurality of pixel rows in each of which a plurality of pixels each including a photoelectric conversion unit and a charge holding unit which holds charges transferred from the photoelectric conversion unit are arranged in one direction, the imaging control method comprising:

performing a first control of exposing the plurality of pixel rows and of transferring charges accumulated in the photoelectric conversion units of the plurality of pixel rows by the exposing to the charge holding units;

performing a second control of reading out a signal corresponding to the charges held in the charge holding units of a part of the pixel rows among the charge holding units in which the charges are held by the first control;

performing a third control of reading out a signal corresponding to the charges held in the charge holding units of the pixel rows other than the part of the pixel rows among the charge holding units in which the charges are held by the first control, and of exposing the part of the pixel rows from which the signal is read out by the second control; and performing a fourth control of reading out a signal corresponding to the charges held in the charge holding units of the part of the pixel rows from which the signal is read out by the second control.

17. A non-transitory computer readable medium storing an imaging control program for controlling an imaging element including a plurality of pixel rows in each of which a plurality of pixels each including a photoelectric conversion unit and a charge holding unit which holds charges transferred from the photoelectric conversion unit are arranged in one direction, the imaging control program causing a processor to execute:

performing a first control of exposing the plurality of pixel rows and of transferring charges accumulated in the photoelectric conversion units of the plurality of pixel rows by the exposing to the charge holding units;

performing a second control of reading out a signal corresponding to the charges held in the charge holding units of a part of the pixel rows among the charge holding units in which the charges are held by the first control;

performing a third control of reading out a signal corresponding to the charges held in the charge holding units of the pixel rows other than the part of the pixel rows among the charge holding units in which the charges are held by the first control, and of exposing the part of the pixel rows from which the signal is read out by the second control; and performing a fourth control of reading out a signal corresponding to the charges held in the charge holding units of the part of the pixel rows from which the signal is read out by the second control.

* * * * *